US012625801B2

(12) United States Patent
Zhang et al.

(10) Patent No.: US 12,625,801 B2
(45) Date of Patent: May 12, 2026

(54) DATA PROCESSING METHOD, APPARATUS, AND SYSTEM, COMPUTING DEVICE, AND STORAGE MEDIUM

(71) Applicant: HUAWEI TECHNOLOGIES CO., LTD., Shenzhen (CN)

(72) Inventors: Rutao Zhang, Shanghai (CN); Di Yu, Hangzhou (CN); Kai Hou, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/737,196

(22) Filed: Jun. 7, 2024

(65) Prior Publication Data

US 2024/0320141 A1 Sep. 26, 2024

Related U.S. Application Data

(63) Continuation of application No. PCT/CN2022/138259, filed on Dec. 11, 2022.

(30) Foreign Application Priority Data

Dec. 10, 2021 (CN) ......................... 202111506284.8
Mar. 11, 2022 (CN) ......................... 202210238254.1

(51) Int. Cl.
*G06F 12/02* (2006.01)

(52) U.S. Cl.
CPC ...... *G06F 12/023* (2013.01); *G06F 2212/251* (2013.01)

(58) Field of Classification Search
CPC ............. G06F 12/023; G06F 2212/251; G06F 2209/549; G06F 3/061; G06F 3/0659; G06F 3/0671; G06F 8/41; G06F 9/30; G06F 9/30043; G06F 3/0629; G06F 9/5016; Y02D 10/00
USPC ........................................................ 711/154
See application file for complete search history.

(56) References Cited

U.S. PATENT DOCUMENTS

| | | | | |
|---|---|---|---|---|
| 6,574,724 | B1 * | 6/2003 | Hoyle | G06F 9/3828 |
| | | | | 712/E9.035 |
| 2015/0378793 | A1 | 12/2015 | Gschwind | |
| 2017/0083326 | A1 * | 3/2017 | Burger | G06F 9/30098 |
| 2018/0181490 | A1 * | 6/2018 | Ros | G06F 12/0831 |
| 2022/0107811 | A1 * | 4/2022 | Abdelhafez | G06F 9/3836 |

OTHER PUBLICATIONS

International Search Report and Written Opinion in International Appln. No. PCT/CN2022/138259, mailed on Mar. 6, 2023, 13 pages (with English translation).

* cited by examiner

*Primary Examiner* — Jared I Rutz
*Assistant Examiner* — Wei Ma
(74) *Attorney, Agent, or Firm* — Fish & Richardson P.C.

(57) ABSTRACT

The present disclosure relates to data processing methods, computer devices, and non-transitory computer-readable storage media. In an example method, at least one processor obtains an instruction sequence of an application program, identifies an execution sequence of read/write instructions in the instruction sequence based on the instruction sequence, and executes the read/write instructions based on the identified execution sequence.

20 Claims, 4 Drawing Sheets

100

DATA PROCESSING METHOD, APPARATUS, AND SYSTEM, COMPUTING DEVICE, AND STORAGE MEDIUM

CROSS-REFERENCE TO RELATED APPLICATIONS

This application is a continuation of International Application No. PCT/CN2022/138259, filed on Dec. 11, 2022, which claims priority to Chinese Patent Application No. 202111506284.8, filed on Dec. 10, 2021, and Chinese Patent Application No. 202210238254.1 filed on Mar. 11, 2022. All of the aforementioned patent applications are hereby incorporated by reference in their entireties.

TECHNICAL FIELD

This application relates to the field of communication technologies, and in particular, to a data processing method, apparatus, and system, a computing device, and a storage medium.

BACKGROUND

An application program includes a read/write instruction for performing a read operation or a write operation on a memory. When executing the application program, a processor inevitably performs a read/write operation on the memory by executing the read/write instruction in the application program. However, in a process in which the processor performs the read/write operation on the memory, the processor may fail to normally execute the application program.

SUMMARY

This application provides a data processing method, apparatus, and system, a computing device, and a storage medium, so that a processor can normally run an application program. The technical solutions are as follows:

According to a first aspect, a data processing method is provided. The method is performed by a processor of a computing device, and the method includes: obtaining an instruction sequence of an application program, identifying an execution sequence of read/write instructions in the instruction sequence based on the instruction sequence, and executing the read/write instructions based on the identified execution sequence, where the instruction sequence includes a plurality of instructions, the plurality of instructions include the read/write instructions for performing a read operation or a write operation on a memory of the computing device, and the application program is deployed in the computing device.

In this method, the processor obtains the instruction sequence of the application program, identifies the execution sequence of the read/write instructions in the instruction sequence based on the instruction sequence, and executes the read/write instructions based on the identified execution sequence, to access the memory of the computing device, so that the processor can normally execute the application program.

In a possible implementation, the identifying an execution sequence of read/write instructions in the instruction sequence based on the instruction sequence includes: identifying an arrangement sequence of the read/write instructions in the instruction sequence as the execution sequence of the read/write instructions.

Based on the foregoing possible implementation, the arrangement sequence of the read/write instructions in the instruction sequence is forcibly identified as the execution sequence of the read/write instructions, so that the arrangement sequence of the read/write instructions in the instruction sequence is consistent with the execution sequence of the read/write instructions. Correspondingly, when the processor executes the read/write instructions based on the execution sequence of the read/write instructions, a case in which a memory access order is inconsistent with the arrangement sequence of the read/write instructions in the application program can be avoided, so that a memory consistency problem can be avoided.

In another possible implementation, the identifying an arrangement sequence of the read/write instructions in the instruction sequence as the execution sequence of the read/write instructions includes: identifying, in a sequential memory access mode, the arrangement sequence of the read/write instructions in the instruction sequence as the execution sequence of the read/write instructions, where the sequential memory access mode requires that the execution sequence of the read/write instructions be consistent with the arrangement sequence of the read/write instructions in the instruction sequence.

Based on the foregoing possible implementation, the sequential memory access mode requires that the execution sequence of the read/write instructions be consistent with the arrangement sequence of the read/write instructions in the instruction sequence. Therefore, in the sequential memory access mode, the processor forcibly identifies the arrangement sequence of the read/write instructions in the instruction sequence as the execution sequence of the read/write instructions. Correspondingly, when the processor executes the read/write instructions based on the execution sequence of the read/write instructions, the case in which the memory access order is inconsistent with the arrangement sequence of the read/write instructions in the application program can be avoided, so that the memory consistency problem can be avoided.

In another possible implementation, the read/write instruction includes a read instruction for performing the read operation on the memory or a write instruction for performing the write operation on the memory, the read instruction has a first semantic, and the write instruction has a second semantic, where the first semantic indicates that a first instruction in the instruction sequence is executed after the read instruction is executed, the second semantic indicates that a second instruction in the instruction sequence is executed before execution of the write instruction is completed, the first instruction is arranged after the read instruction in the instruction sequence, and the second instruction is arranged before the write instruction in the instruction sequence.

Based on the foregoing possible implementation, because the read instruction has the first semantic, and the write instruction has the second semantic, the processor can be automatically triggered to identify the execution sequence of the read/write instructions based on the instruction sequence. Correspondingly, when the processor executes the read/write instructions based on the execution sequence of the read/write instructions, the case in which the memory access order is inconsistent with the arrangement sequence of the read/write instructions in the application program can be avoided.

In another possible implementation, the read instruction is fetched through compiling an extended memory read instruction, the extended memory read instruction has the first semantic, and the extended memory read instruction is an instruction that is added to an instruction set of the processor and that is used to instruct to read memory data; and the write instruction is fetched through compiling an extended memory write instruction, the extended memory write instruction has the second semantic, and the extended memory write instruction is an instruction that is added to the instruction set of the processor and that is used to instruct to write the memory data.

Based on the foregoing possible implementation, because the extended memory read instruction has the first semantic, the read instruction fetched through compiling the extended memory read instruction also has the first semantic, so that the processor can sequentially execute the read instruction in the instruction sequence. In addition, because the extended memory write instruction has the second semantic, the write instruction fetched through compiling the extended memory write instruction also has the second semantic, so that the processor can sequentially execute the write instruction in the instruction sequence.

In another possible implementation, the extended memory read instruction includes at least one of a first extended memory read instruction, a second extended memory read instruction, a third extended memory read instruction, and a fourth extended memory read instruction, and the extended memory write instruction includes at least one of a first extended memory write instruction and a second extended memory write instruction. None of addressing modes supported by the first extended memory read instruction, the second extended memory read instruction, and the first extended memory write instruction includes an unscaled immediate addressing mode, and all of the third extended memory read instruction, the fourth extended memory read instruction, and the second extended memory write instruction support the unscaled immediate addressing mode. The first extended memory read instruction is used to instruct to determine a storage address in the memory based on the supported addressing mode, and read a first byte quantity of data in the determined storage address to a first destination register. The second extended memory read instruction is used to instruct to determine a storage address in the memory based on the supported addressing mode, read a second byte quantity of data in the determined storage address to a second destination register, and fill a remaining bit of the second destination register with a sign bit of the read data. The third extended memory read instruction is used to instruct to determine a storage address in the memory based on the unscaled immediate addressing mode, and read a first byte quantity of data in the determined storage address to a third destination register. The fourth extended memory read instruction is used to instruct to determine a storage address in the memory based on the unscaled immediate addressing mode, read a second byte quantity of data in the determined storage address to a fourth destination register, and fill a remaining bit of the fourth destination register with a sign bit of the read data. The first extended memory write instruction is used to instruct to determine a storage address in the memory based on the supported addressing mode, and write a third byte quantity of data in a first source register to the determined storage address. The second extended memory write instruction is used to instruct to determine a storage address in the memory based on the unscaled immediate addressing mode, and write a third byte quantity of data in a second source register to the determined storage address.

Based on the foregoing possible implementation, a plurality of extended memory read/write instructions are provided, so that requirements for the extended memory read/write instruction can be met in a plurality of application scenarios.

In another possible implementation, the first byte quantity includes one byte, two bytes, four bytes, or eight bytes, the second byte quantity includes one byte, two bytes, or four bytes, and the third byte quantity includes one byte, two bytes, four bytes, or eight bytes; the addressing modes supported by the first extended memory read instruction, the second extended memory read instruction, and the first extended memory write instruction include a scaled immediate addressing mode, a label addressing mode, or a register addressing mode, and an immediate used when address offset is performed in the scaled immediate addressing mode is a scaled operand in a corresponding instruction; and an immediate used when the address offset is performed in the unscaled immediate addressing mode is an operand in a corresponding instruction, and a value range of the operand is −256 to 256.

Based on the foregoing possible implementation, a plurality of addressing modes supported by the first byte quantity, the second byte quantity, and the third byte quantity are provided, to meet requirements for a byte quantity and an addressing mode supported by an extended memory read/write instruction in different application scenarios.

In another possible implementation, the read instruction is fetched through compiling an extended memory read instruction, and the extended memory read instruction is an instruction fetched through adding the first semantic to a general memory read instruction in an instruction set of the processor; and the instruction of the write operation is fetched through compiling an extended memory write instruction, and the extended memory write instruction is an instruction fetched through adding the second semantic to a general memory write instruction in the instruction set.

Based on the foregoing possible implementation, the first semantic is added to the general memory read instruction in the instruction set, so that the extended memory read instruction can be fetched, and a function of the general memory read instruction is extended, so that the general memory read instruction is applicable to more application scenarios. The second semantic is added to the general memory write instruction in the instruction set, so that an extended memory write instruction can be fetched, and a function of the general memory write instruction is extended, so that the general memory write instruction is applicable to more application scenarios.

In another possible implementation, the read/write instruction includes a read instruction for performing the read operation on the memory or a write instruction for performing the write operation on the memory, the read instruction is fetched through compiling a general memory read instruction in an instruction set of the processor, and the write instruction is fetched through compiling a general memory write instruction in the instruction set of the processor.

Based on the foregoing possible implementation, the general memory read instruction and the general memory write instruction do not have a special semantic (for example, the first semantic or the second semantic). Correspondingly, the read/write instruction fetched through compiling the two general memory instructions does not have the special semantic either, and the processor still identifies the execution sequence of the read/write instructions based on the instruction sequence. Correspondingly, when the processor executes the read/write instructions based on the execution sequence of the read/write instructions, the processor can also normally execute the application program.

According to a second aspect, a data processing system is provided. The data processing system includes a first computing device and a second computing device, and the first computing device includes a processor.

The second computing device is configured to: compile an application source program to obtain an application program, and send the application program to the first computing device.

The processor is configured to receive the application program, and obtain an instruction sequence of the application program, where the instruction sequence includes a plurality of instructions, and the plurality of instructions include read/write instructions for performing a read operation or a write operation on a memory of the first computing device.

The processor is further configured to: identify an execution sequence of the read/write instructions based on the instruction sequence, and execute the read/write instructions based on the execution sequence of the read/write instructions.

In a possible implementation, the processor is further configured to identify an arrangement sequence of the read/write instructions in the instruction sequence as the execution sequence of the read/write instructions.

In another possible implementation, the processor is further configured to identify, in a sequential memory access mode, the arrangement sequence of the read/write instructions in the instruction sequence as the execution sequence of the read/write instructions, where the sequential memory access mode requires that the execution sequence of the read/write instructions be consistent with the arrangement sequence of the read/write instructions in the instruction sequence.

In another possible implementation, the read/write instruction includes a read instruction for performing the read operation on the memory or a write instruction for performing the write operation on the memory, the read instruction has a first semantic, and the write instruction has a second semantic, where the first semantic indicates that a first instruction in the instruction sequence is executed after the read instruction is executed, the second semantic indicates that a second instruction in the instruction sequence is executed before execution of the write instruction is completed, the first instruction is arranged after the read instruction in the instruction sequence, and the second instruction is arranged before the write instruction in the instruction sequence.

In another possible implementation, the read instruction is fetched through compiling an extended memory read instruction, the extended memory read instruction has the first semantic, and the extended memory read instruction is an instruction that is added to an instruction set of the processor and that is used to instruct to read memory data; and the write instruction is fetched through compiling an extended memory write instruction, the extended memory write instruction has the second semantic, and the extended memory write instruction is an instruction that is added to the instruction set of the processor and that is used to instruct to write the memory data.

In another possible implementation, the extended memory read instruction includes at least one of a first extended memory read instruction, a second extended memory read instruction, a third extended memory read instruction, and a fourth extended memory read instruction, and the extended memory write instruction includes at least one of a first extended memory write instruction and a second extended memory write instruction. None of addressing modes supported by the first extended memory read instruction, the second extended memory read instruction, and the first extended memory write instruction includes an unscaled immediate addressing mode, and all of the third extended memory read instruction, the fourth extended memory read instruction, and the second extended memory write instruction support the unscaled immediate addressing mode. The first extended memory read instruction is used to instruct to determine a storage address in the memory based on the supported addressing mode, and read a first byte quantity of data in the determined storage address to a first destination register. The second extended memory read instruction is used to instruct to determine a storage address in the memory based on the supported addressing mode, read a second byte quantity of data in the determined storage address to a second destination register, and fill a remaining bit of the second destination register with a sign bit of the read data. The third extended memory read instruction is used to instruct to determine a storage address in the memory based on the unscaled immediate addressing mode, and read a first byte quantity of data in the determined storage address to a third destination register. The fourth extended memory read instruction is used to instruct to determine a storage address in the memory based on the unscaled immediate addressing mode, read a second byte quantity of data in the determined storage address to a fourth destination register, and fill a remaining bit of the fourth destination register with a sign bit of the read data. The first extended memory write instruction is used to instruct to determine a storage address in the memory based on the supported addressing mode, and write a third byte quantity of data in a first source register to the determined storage address. The second extended memory write instruction is used to instruct to determine a storage address in the memory based on the unscaled immediate addressing mode, and write a third byte quantity of data in a second source register to the determined storage address.

In another possible implementation, the first byte quantity includes one byte, two bytes, four bytes, or eight bytes, the second byte quantity includes one byte, two bytes, or four bytes, and the third byte quantity includes one byte, two bytes, four bytes, or eight bytes; the addressing modes supported by the first extended memory read instruction, the second extended memory read instruction, and the first extended memory write instruction include a scaled immediate addressing mode, a label addressing mode, or a register addressing mode, and an immediate used when address offset is performed in the scaled immediate addressing mode is a scaled operand in a corresponding instruction; and an immediate used when the address offset is performed in the unscaled immediate addressing mode is an operand in a corresponding instruction, and a value range of the operand is −256 to 256.

In another possible implementation, the read instruction is fetched through compiling an extended memory read instruction, and the extended memory read instruction is an instruction fetched through adding the first semantic to a general memory read instruction in an instruction set of the processor; and the instruction of the write operation is fetched through compiling an extended memory write instruction, and the extended memory write instruction is an instruction fetched through adding the second semantic to a general memory write instruction in the instruction set.

In another possible implementation, the read/write instruction includes a read instruction for performing the read operation on the memory or a write instruction for performing the write operation on the memory, the read instruction is fetched through compiling a general memory read instruction in an instruction set of the processor, and the write instruction is fetched through compiling a general memory write instruction in the instruction set of the processor.

According to a third aspect, a data processing apparatus is provided, and is configured to perform the foregoing data processing method. Specifically, the data processing apparatus includes a functional module configured to perform the data processing method according to any one of the first aspect or the optional implementations of the first aspect.

According to a fourth aspect, a computing device is provided. The computing device includes a processor, and the processor is configured to perform the method according to any one of the first aspect or the optional manners of the first aspect.

According to a fifth aspect, a computer-readable storage medium is provided. The storage medium stores at least one piece of program code, and the program code is read by a processor of a computing device, so that the processor performs the method according to any one of the first aspect or the optional manners of the first aspect.

According to a sixth aspect, a computer program product is provided. The computer program product includes at least one piece of program code, the at least one piece of program code is stored in a computer-readable storage medium, and the at least one piece of program code is read by a processor of a computing device, so that the processor performs the method according to any one of the first aspect or the optional implementations of the first aspect.

In this application, based on the implementations according to the foregoing aspects, the implementations may be further combined to provide more implementations.

DESCRIPTION OF EMBODIMENTS

Figure 1:
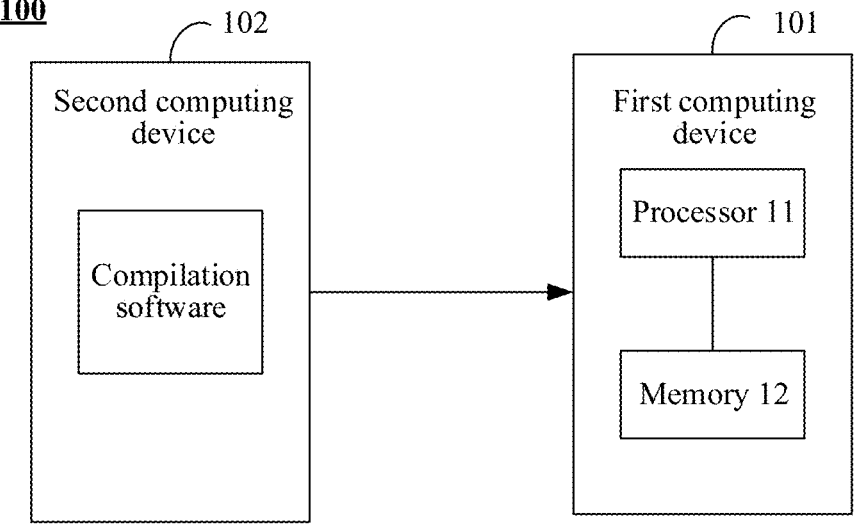
FIG. 1 is a schematic diagram of a structure of a data processing system 100 according to an embodiment of this application.

For ease of understanding, some terms in embodiments of this application are first explained as follows:

Application program: The application program is an instruction sequence that is developed and executed on an operating system to complete at least one specific task.

Instruction sequence: The instruction sequence includes a plurality of instructions. Optionally, the plurality of instructions are sequentially arranged to form the instruction sequence, and each instruction corresponds to one arrangement sequence number in the instruction sequence.

The plurality of instructions in the instruction sequence include a read instruction or a write instruction. If the plurality of instructions include the read instruction, there is at least one read instruction in the plurality of instructions. If the plurality of instructions include the write instruction, there is at least one write instruction in the plurality of instructions. The read instruction is used to instruct to perform a read operation on a memory (main memory), and the read operation is an operation of reading data in the memory. The write instruction is used to instruct to perform a write operation on the memory, and the write operation is an operation of writing data to the memory. For ease of description, the read instruction or the write instruction may also be collectively referred to as a read/write instruction.

First semantic: The first semantic indicates a first instruction in an instruction sequence to be executed after a read instruction is executed, where for a read instruction in the instruction sequence, the first instruction is an instruction that is arranged after the read instruction in the instruction sequence. For example, the instruction sequence includes 100 instructions, and the $2^{nd}$ instruction in the 100 instructions is a read instruction. For the read instruction, the $3^{rd}$ instruction to the $100^{th}$ instruction in the 100 instructions are all first instructions. Because the first semantic indicates the first instruction in the instruction sequence to be executed after the read instruction is executed, the first semantic can prevent an instruction that is arranged after the read instruction in the instruction sequence from being executed before the read instruction is executed. In some embodiments, the first semantic is also referred to as an acquire semantic (acquire semantic).

Second semantic: The second semantic indicates a second instruction in an instruction sequence to be executed before execution of a write instruction is completed, where for a write instruction in the instruction sequence, the second instruction is an instruction that is arranged before the write instruction in the instruction sequence. For example, the instruction sequence includes 100 instructions, and the $3^{rd}$ instruction in the 100 instructions is a write instruction. For the write instruction, both the $1^{st}$ instruction and the $2^{nd}$ instruction in the 100 instructions are second instructions. Because the second semantic indicates the second instruction in the instruction sequence to be executed before the execution of the write instruction is completed, the second semantic can prevent an instruction that is arranged before the write instruction in the instruction sequence from being executed after the write instruction is executed. In some embodiments, the second semantic is also referred to as a release semantic (release semantic).

Sequential memory access mode: The sequential memory access mode requires that an execution sequence of read/write instructions in an instruction sequence be consistent with an arrangement sequence of the read/write instructions in the instruction sequence.

Memory model: The memory model is for defining a manner in which a processor executes a read/write instruction. The memory model includes a weak memory model (weakly-ordered memory model).

Weak memory model: When executing an application program, a processor can exchange an execution sequence of read/write instructions in the application program without changing behavior of the application program.

According to embodiments of this application, when an application program is executed, an execution sequence of read/write instructions in the application program is identified based on an instruction sequence of the application program, and the read/write instructions in the application program are executed based on the execution sequence of the read/write instructions, so that the processor can normally execute the application program. Correspondingly, a bad case such as a random crash, a restart, or an incorrect running result of the application program is reduced, and reliability of the processor that supports a weak memory model is increased, to further improve goodwill and market sales of the processor that supports the weak memory model.

The following further describes in detail embodiments of this application with reference to accompanying drawings.

FIG. 1 is a schematic diagram of a structure of a data processing system 100 according to an embodiment of this application. The data processing system 100 includes a first computing device 101 and a second computing device 102. The first computing device 101 and the second computing device 102 communicate with each other directly or indirectly in a wired or wireless communication mode. A user using the first computing device 101 is referred to as a first user, and a user using the second computing device 102 is referred to as a second user.

Compilation software is deployed in the second computing device 102, and the compilation software is for providing a function of compiling an application source program. The second computing device 102 compiles the application source program by using the compilation software, to obtain a compiled application program. Both the application source program and the compiled application program are for implementing a customized function. The application source program is source code compiled by using a high-level programming language, to implement the customized function. The application source program is compiled to obtain an instruction sequence that can be identified by a processor. The instruction sequence is an application program, and the instruction sequence is, for example, an instruction sequence including binary data.

The first computing device 101 obtains the compiled application program from the second computing device 102, and the first computing device 101 deploys the obtained application program. For example, the first computing device 101 installs the application program. The first user delivers an execution instruction for executing the application program to the first computing device 101, and the first computing device executes the application program (that is, runs the application program) in response to the execution instruction for the application program.

The first computing device 101 includes a processor 11 and a memory 12. When the first computing device 101 executes the application program, each instruction in the application program is executed by the processor 11 in the first computing device 101, and temporary data in a process of executing the application program is stored in the memory 12. Therefore, in a process of executing the instruction, the processor 11 performs a read/write operation on the memory 12, to read data from the memory and write data to the memory. To enable the processor 11 to better interact with the memory 12, an execution manner (for example, a memory model) of a read/write instruction is defined for the processor 11. Correspondingly, the read/write operation performed by the processor 11 on the memory 12 needs to comply with the defined memory model. Otherwise, a memory access error occurs.

Correspondingly, to enable a processor to run the application program normally, when developing the application program for the processor, a developer considers a requirement of a memory model supported by the processor on an execution sequence of read/write instructions. Correspondingly, the application program developed for the processor also supports the memory model supported by the processor, and an arrangement sequence of the read/write instructions in the application program meets the requirement of the memory model on the execution sequence of the read/write instructions.

Processors of different architectures may support a same memory model. For example, both a processor of an advanced reduced instruction set computing machine (advanced RISC machine, ARM) architecture and a processor of a performance-optimized enhanced reduced instruction set computing (performance optimization with enhanced RISC, POWER) architecture support a weak memory model, and both an application program developed based on an ARM architecture processor and an application program developed based on a POWER architecture processor support the weak memory model.

In this embodiment of this application, an instruction set supported by the processor of the first computing device includes at least one of a general instruction set, an extended instruction set 1, and an extended instruction set 2, as shown in Table 1. Still refer to Table 1. An instruction that is in the general instruction set and that is for accessing the memory includes a general memory read instruction and a general memory write instruction, where the general memory read instruction includes at least one of general memory read instructions 1 to 4, and the general memory write instruction includes at least one of general memory write instructions 1 and 2. An instruction that is in the extended instruction set 1 and that is for accessing the memory includes an extended memory read instruction 1 and an extended memory write instruction 1, where the extended memory read instruction 1 includes at least one of extended memory read instructions 11 to 14, and the extended memory write instruction 1 includes at least one of extended memory write instructions 11 and 12. An instruction that is in the extended instruction set 2 and that is for accessing the memory includes an extended memory read instruction 2 and an extended memory write instruction 2, where the extended memory read instruction 2 includes at least one of extended memory read instructions 21 to 24, and the extended memory write instruction 2 includes at least one of extended memory write instructions 21 and 22.

TABLE 1

| Instruction set | Classification of instructions for accessing a memory | Classification of read/write instructions |
|---|---|---|
| General instruction set | General memory read instruction | General memory read instruction 1 |
| | | General memory read instruction 2 |
| | | General memory read instruction 3 |
| | | General memory read instruction 4 |
| | General memory write instruction | General memory write instruction 1 |
| | | General memory write instruction 2 |
| Extended instruction set 1 | Extended memory read instruction 1 | Extended memory read instruction 11 |
| | | Extended memory read instruction 12 |
| | | Extended memory read instruction 13 |
| | | Extended memory read instruction 14 |

TABLE 1-continued

| Instruction set | Classification of instructions for accessing a memory | Classification of read/write instructions |
|---|---|---|
| | Extended memory write instruction 1 | Extended memory write instruction 11 |
| | | Extended memory write instruction 12 |
| Extended instruction set 2 | Extended memory read instruction 2 | Extended memory read instruction 21 |
| | | Extended memory read instruction 22 |
| | | Extended memory read instruction 23 |
| | | Extended memory read instruction 24 |
| | Extended memory read instruction 2 | Extended memory write instruction 21 |
| | | Extended memory write instruction 22 |

With reference to Table 1, the following describes various instruction sets supported by the processor of the first computing device as follows:

First Instruction Set: General Instruction Set

The general instruction set is an instruction set originally supported by the processor. For example, the processor is a processor of an ARM64 architecture, and the general instruction set is an ARM64 instruction set. The general memory (namely, memory) read instruction in the general instruction set is used to instruct to determine a to-be-read storage address in the memory based on a supported addressing mode, and read a specific byte quantity of data in the storage address to a destination register, where the specific byte quantity is a bit width of the to-be-read data instructed by the general memory read instruction.

The general memory read instruction supports at least one of an immediate addressing mode, a label addressing mode, and a register addressing mode. There are two immediate addressing modes: a scaled (scaled) immediate addressing mode and an unscaled (unscaled, U) immediate addressing mode.

The scaled immediate addressing mode indicates to scale an operand in a corresponding instruction, and perform addressing by using a scaled operand. A scaling multiple of the operand may be set based on a scenario requirement. For example, the scaling multiple is one, four, or eight. When the scaling multiple is one, the operands before and after the scaling are the same. The scaling multiple of the operand is not limited in this embodiment of this application. For example, for a general memory read instruction that supports the scaled immediate addressing mode, when executing the general memory read instruction, the processor scales an operand in the general memory read instruction, and performs address offset on an address stored in a base address register by using a scaled operand, to determine a to-be-read storage address in the memory.

The unscaled immediate addressing mode indicates to use an operand whose value ranges from −256 to 256 in a corresponding instruction to perform addressing, and not to scale an operand in the corresponding instruction. For example, for a general memory read instruction that supports the unscaled immediate addressing mode, a value range of an operand in the general memory read instruction is −256 to 256. When executing the general memory read instruction, the processor adds the operand in the general memory read instruction and an address stored in a base address register, to obtain a to-be-read storage address. For the immediate addressing mode, operands used when the address offset is performed are collectively referred to as immediates.

As shown in the following Table 2, the specific byte quantity includes a first byte quantity or a second byte quantity. Based on different supported addressing modes and specific byte quantities, the general memory read instruction includes at least one of general memory read instructions 1 to 4.

TABLE 2

| Instruction | Instruction | Instruction | Supported addressing mode | Specific byte quantity | |
|---|---|---|---|---|---|
| | | | | First byte quantity | Second byte quantity |
| General memory read instruction | General memory read instruction 1 | General memory read instruction 11 | Scaled immediate addressing mode, | One byte | / |
| | | General memory read instruction 12 | label addressing mode, and | Two bytes | / |
| | | General memory read instruction 13 | register addressing mode | Four bytes or eight bytes | / |
| | General memory read instruction 2 | General memory read instruction 21 | Scaled immediate addressing mode, | / | One byte |
| | | General memory read instruction 22 | label addressing mode, and | / | Two bytes |
| | | General memory read instruction 23 | register addressing mode | / | Four bytes |
| | General memory read instruction 3 | General memory read instruction 31 | Unscaled immediate | One byte | / |
| | | General memory read instruction 32 | addressing mode | Two bytes | / |
| | | General memory read instruction 33 | | Four bytes or eight bytes | / |

TABLE 2-continued

| Instruction | Instruction | Instruction | Supported addressing mode | Specific byte quantity | |
|---|---|---|---|---|---|
| | | | | First byte quantity | Second byte quantity |
| General memory read instruction 4 | General memory read instruction 41 | Unscaled immediate addressing mode | | | One byte |
| | General memory read instruction 42 | | | | Two bytes |
| | General memory read instruction 43 | | | | Four bytes |

"/" in Table 2 represents none.

The following describes in detail a processing manner of each instruction in Table 2.

The general memory read instruction 1 is used to instruct to determine a storage address in the memory based on the supported addressing mode, and read a first byte quantity of data in the determined storage address to a first destination register.

In a possible implementation, the first byte quantity includes one byte, two bytes, four bytes, or eight bytes. As shown in Table 2, based on different values of the first byte quantity, the general memory read instruction 1 includes at least one of the general memory read instructions 11 to 13. For the general memory read instruction 13, when a length of the first destination register is greater than or equal to four bytes and less than eight bytes, the first byte quantity is four bytes. When a length of the first destination register is greater than or equal to eight bytes, the first byte quantity is eight bytes.

Encoding formats and representation manners of different general memory read instructions 1 are different. In a possible implementation, load register byte (Load Register Byte, LDRB), load register halfword (Load Register Halfword, LDRH), and load register (Load Register, LDR) represent the general memory read instruction 11, the general memory read instruction 12, and the general memory read instruction 13 respectively. Alternatively, UR11, UR12, and UR13 represent the general memory read instruction 11, the general memory read instruction 12, and the general memory read instruction 13 respectively, to distinguish between different general memory read instructions 1.

The general memory read instruction 2 is used to instruct to determine a storage address in the memory based on the supported addressing mode, read a second byte quantity of data in the determined storage address to a second destination register, and fill a remaining bit of the second destination register with a sign bit of the read data.

A length of the second destination register is greater than the second byte quantity, and the read data includes the sign bit (sign, S) and a numerical bit. In a possible implementation, the general memory read instruction 2 is further for supporting in sequentially performing filling of the read data in a sequence from a low bit to a high bit of the second destination register. Correspondingly, the remaining bit of the second destination register is a remaining high bit of the second destination register, and the remaining high bit is filled with the sign bit of the read data.

In a possible implementation, the second byte quantity includes one byte, two bytes, or four bytes. As shown in Table 2, based on different values of the second byte quantity, the general memory read instruction 2 includes at least one of the general memory read instructions 21 to 23. Encoding formats and representation manners of different general memory read instructions 2 are different. In a possible implementation, load register signed byte (Load Register Signed Byte, LDRSB), load register signed halfword (Load Register Signed Halfword, LDRSH), and load register signed word (Load Register Signed Word, LDRSW) represent the general memory read instruction 21, the general memory read instruction 22, and the general memory read instruction 23 respectively. Alternatively, UR21, UR22, and UR23 represent the general memory read instruction 21, the general memory read instruction 22, and the general memory read instruction 23 respectively, to distinguish between different general memory read instructions 2.

The general memory read instruction 3 is used to instruct to determine a storage address in the memory based on the unscaled immediate addressing mode, and read a first byte quantity of data in the determined storage address to a third destination register.

As shown in Table 2, based on different values of the first byte quantity, the general memory read instruction 3 includes at least one of the general memory read instructions 31 to 33. For the general memory read instruction 33, when a length of the third destination register is greater than or equal to four bytes and less than eight bytes, the first byte quantity is four bytes. When a length of the third destination register is greater than or equal to eight bytes, the first byte quantity is eight bytes.

Encoding formats and representation manners of different general memory read instructions 3 are different. In a possible implementation, load register byte unscaled (Load Register Byte Unscaled, LDURB), load register halfword unscaled (Load Register Halfword Unscaled, LDURH), and load register unscaled (Load Register Unscaled, LDUR) represent the general memory read instruction 31, the general memory read instruction 32, and the general memory read instruction 33 respectively. Alternatively, UR31, UR32, and UR33 represent the general memory read instruction 31, the general memory read instruction 32, and the general memory read instruction 33 respectively, to distinguish between different general memory read instructions 3.

The general memory read instruction 4 is used to instruct to determine a storage address in the memory based on the unscaled immediate addressing mode, read a second byte quantity of data in the determined storage address to a fourth destination register, and fill a remaining bit of the fourth destination register with a sign bit of the read data.

A length of the fourth destination register is greater than the second byte quantity, and the read data includes the sign bit and a numerical bit. In a possible implementation, the general memory read instruction 4 is further for supporting in sequentially performing filling of the read data in a sequence from a low bit to a high bit of the fourth destination register. Correspondingly, the remaining bit of the fourth destination register is a remaining high bit of the fourth destination register, and the remaining high bit is filled with the sign bit of the read data.

As shown in Table 2, based on different values of the second byte quantity, the general memory read instruction 4 includes the general memory read instructions 41 to 43.

Encoding formats and representation manners of different general memory read instructions 4 are different. In a possible implementation, load register signed byte unscaled (Load Register Signed Byte Unscaled, LDURSB), load register signed halfword unscaled (Load Register Signed Halfword Unscaled, LDURSH), and load register signed word unscaled (Load Register Signed Word Unscaled, LDURSW) represent the general memory read instruction 41, the general memory read instruction 42, and the general memory read instruction 43 respectively. Alternatively, UR41, UR42, and UR43 represent the general memory read instruction 41, the general memory read instruction 42, and the general memory read instruction 43 respectively, to distinguish between different general memory read instructions 4.

The general memory write instruction in the general instruction set is used to instruct to determine a to-be-written storage address in the memory based on the supported addressing mode, and write a third byte quantity of data in a source register to the determined storage address, where the third byte quantity is a bit width of to-be-written data instructed by the general memory write instruction. The general memory write instruction supports at least one of the immediate addressing mode, the label addressing mode, and the register addressing mode.

As shown in the following Table 3, based on different supported addressing modes, the general memory write instruction includes at least one of general memory write instructions 1 and 2.

a length of the first source register is greater than or equal to eight bytes, the third byte quantity is eight bytes.

Encoding formats and representation manners of different general memory write instructions 1 are different. In a possible implementation, store register byte (Store Register Byte, STRB), store register halfword (Store Register Halfword, STRH), and store register (Store Register, STR) represent the general memory write instruction 11, the general memory write instruction 12, and the general memory write instruction 13 respectively. Alternatively, UW11, UW12, and UW13 represent the general memory write instruction 11, the general memory write instruction 12, and the general memory write instruction 13 respectively, to distinguish between different general memory write instructions 1.

The general memory write instruction 2 is used to instruct to determine a storage address in the memory based on the unscaled immediate addressing mode, and write a third byte quantity of data in a second source register to the determined storage address.

As shown in Table 3, based on different values of the third byte quantity, the general memory write instruction 2 includes the general memory write instructions 21 to 23. For the general memory write instruction 23, when a length of the second source register is greater than or equal to four bytes and less than eight bytes, the third byte quantity is four bytes. When a length of the second source register is greater than or equal to eight bytes, the third byte quantity is eight bytes.

Encoding formats and representation manners of different general memory write instructions 2 are different. In a possible implementation, store register byte unscaled (Store Register Byte Unscaled, STURB), store register halfword unscaled (Store Register Halfword Unscaled, STURH), and store register unscaled (Store Register Unscaled, STUR)

TABLE 3

| Instruction | Instruction | Instruction | Supported addressing mode | Third byte quantity |
|---|---|---|---|---|
| General memory write instruction | General memory write instruction 1 | General memory write instruction 11 | Scaled immediate addressing mode, | One byte |
| | | General memory write instruction 12 | label addressing mode, and | Two bytes |
| | | General memory write instruction 13 | register addressing mode | Four bytes or eight bytes |
| | General memory write instruction 2 | General memory write instruction 21 | Unscaled immediate addressing mode | One byte |
| | | General memory write instruction 22 | | Two bytes |
| | | General memory write instruction 23 | | Four bytes or eight bytes |

The following describes in detail a processing process of each instruction in Table 3.

The general memory write instruction 1 is used to instruct to determine a storage address in the memory based on a supported addressing mode, and write a third byte quantity of data in a first source register to the determined storage address.

In a possible implementation, the third byte quantity includes one byte, two bytes, four bytes, or eight bytes. As shown in Table 3, based on different values of the third byte quantity, the general memory write instruction 1 includes the general memory write instructions 11 to 13. For the general memory write instruction 13, when a length of the first source register is greater than or equal to four bytes and less than eight bytes, the third byte quantity is four bytes. When represent the general memory write instruction 21, the general memory write instruction 22, and the general memory write instruction 23 respectively. Alternatively, UW21, UW22, and UW23 represent the general memory write instruction 21, the general memory write instruction 22, and the general memory write instruction 23 respectively, to distinguish between different general memory write instructions 2.

In a possible implementation, the general instruction set further includes at least one other function instruction, and the at least one other function instruction is for implementing a function other than memory access. The at least one other function instruction is not limited herein in this embodiment of this application.

Second Instruction Set: Extended Instruction Set 1

The extended instruction set 1 is an instruction set extended for the processor of the first computing device. The addressing modes and specific byte quantities, the extended memory read instruction 1 includes at least one of extended memory read instructions 11 to 14.

TABLE 4

| Instruction | Instruction | Instruction | Supported addressing mode | Specific byte quantity | | Semantic |
| | | | | First byte quantity | Second byte quantity | |
| --- | --- | --- | --- | --- | --- | --- |
| Extended memory read instruction 1 | Extended memory read instruction 11 | Extended memory read instruction 111 | Scaled immediate addressing mode, label addressing mode, and register addressing mode | One byte | / | First semantic |
| | | Extended memory read instruction 112 | | Two bytes | / | |
| | | Extended memory read instruction 113 | | Four bytes or eight bytes | / | |
| | Extended memory read instruction 12 | Extended memory read instruction 121 | Scaled immediate addressing mode, label addressing mode, and register addressing mode | / | One byte | |
| | | Extended memory read instruction 122 | | / | Two bytes | |
| | | Extended memory read instruction 123 | | / | Four bytes | |
| | Extended memory read instruction 13 | Extended memory read instruction 131 | Unscaled immediate addressing | One byte | / | |
| | | Extended memory read instruction 132 | | Two bytes | / | |
| | | Extended memory read instruction 133 | | Four bytes or eight bytes | / | |
| | Extended memory read instruction 14 | Extended memory read instruction 141 | Unscaled immediate addressing mode | | One byte | |
| | | Extended memory read instruction 142 | | | Two bytes | |
| | | Extended memory read instruction 143 | | | Four bytes | | extended memory read instruction 1 and the extended memory write instruction 1 in the extended instruction set 1 are respectively instructions that are added to the general instruction set of the processor and that are for performing a read/write operation on a memory. For example, the general memory read instruction in the general instruction set is replaced with the extended memory read instruction 1, and the general memory write instruction in the general instruction set is replaced with the extended memory write instruction 1, to obtain the extended instruction set 1.

The following separately describes the extended memory read instruction 1 and an extended memory write instruction 1. Herein, the extended memory read instruction 1 is first described as follows:

The extended memory read instruction 1 is used to instruct to determine a to-be-read storage address in the memory based on a supported addressing mode, and read a specific byte quantity of data in the storage address to a destination register, and the extended memory read instruction 1 further has a first semantic.

The extended memory read instruction 1 supports at least one of the immediate addressing mode, the label addressing mode, and the register addressing mode. For example, as shown in the following Table 4, based on different supported "/" in Table 4 represents none.

The following describes in detail a processing process of each instruction in Table 4.

The extended memory read instruction 11 is used to instruct to determine a storage address in the memory based on the supported addressing mode, and read a first byte quantity of data in the determined storage address to a first destination register, and the extended memory read instruction 11 further has the first semantic.

The extended memory read instruction 11 is a memory read instruction extended based on a function of the general memory read instruction 1. The extended memory read instruction 11 has the function of the general memory read instruction 1, and further has the first semantic. An instruction format of the extended memory read instruction 11 may be the same as or different from that of the general memory read instruction 1, but an encoding format of the extended memory read instruction 11 is different from that of the general memory read instruction 1.

As shown in Table 4, based on different values of the first byte quantity, the extended memory read instruction 11 includes at least one of the extended memory read instructions 111 to 113. The extended memory read instructions 111 to 113 are respectively memory read instructions newly added based on the general memory read instructions 11 to 13. In comparison with the general memory read instructions 11 to 13, the extended memory read instructions 111 to 113 respectively have functions of the general memory read instructions 11 to 13, and all the extended memory read instructions 111 to 113 have the first semantic, but none of the general memory read instructions 11 to 13 has the first semantic.

Encoding formats and representation manners of different extended memory read instructions 11 are different. In a possible implementation, LDRBE1, LDRHE1, and LDRE1 represent the extended memory read instruction 111, the extended memory read instruction 112, and the extended memory read instruction 113 respectively. Herein, "E1" is a first extension form of a general extended memory read instruction. Alternatively, ER111, ER112, and ER113 represent the extended memory read instruction 111, the extended memory read instruction 112, and the extended memory read instruction 113 respectively, to distinguish between different extended memory read instructions 11.

The extended memory read instruction 12 is used to instruct to determine a storage address in the memory based on the supported addressing mode, read a second byte quantity of data in the determined storage address to a second destination register, and fill a remaining bit of the second destination register with a sign bit of the read data, where the extended memory read instruction 12 further has the first semantic.

The extended memory read instruction 12 is a memory read instruction extended based on a function of the general memory read instruction 2. The extended memory read instruction 12 has the function of the general memory read instruction 2, and further has the first semantic. An instruction format of the extended memory read instruction 12 may be the same as or different from that of the general memory read instruction 2, but an encoding format of the extended memory read instruction 12 is different from that of the general memory read instruction 2.

As shown in Table 4, based on different values of the second byte quantity, the extended memory read instruction 12 includes at least one of the extended memory read instructions 121 to 123. The extended memory read instructions 121 to 123 are respectively memory read instructions newly added based on the general memory read instructions 21 to 23. In comparison with the general memory read instructions 21 to 23, the extended memory read instructions 121 to 123 respectively have functions of the general memory read instructions 21 to 23, and all the extended memory read instructions 121 to 123 have the first semantic, but none of the general memory read instructions 21 to 23 has the first semantic.

Encoding formats and representation manners of different extended memory read instructions 11 are different. In a possible implementation, LDRSBE1, LDRSHE1, and LDR-SWE1 represent the extended memory read instruction 121, the extended memory read instruction 122, and the extended memory read instruction 123 respectively. Alternatively, ER121, ER122, and ER123 represent the extended memory read instruction 121, the extended memory read instruction 122, and the extended memory read instruction 123 respectively, to distinguish between different extended memory read instructions 12.

The extended memory read instruction 13 is used to instruct to determine a storage address in the memory based on the unscaled immediate addressing mode, and read a first byte quantity of data in the determined storage address to a third destination register, and the extended memory read instruction 13 further has the first semantic.

The extended memory read instruction 13 is a memory read instruction extended based on a function of the general memory read instruction 3. The extended memory read instruction 13 has the function of the general memory read instruction 3, and further has the first semantic. An instruction format of the extended memory read instruction 13 may be the same as or different from that of the general memory read instruction 3, but an encoding format of the extended memory read instruction 13 is different from that of the general memory read instruction 3.

As shown in Table 4, based on different values of the first byte quantity, the extended memory read instruction 13 includes at least one of the extended memory read instructions 131 to 133. The extended memory read instructions 131 to 133 are respectively memory read instructions newly added based on the general memory read instructions 31 to 33. In comparison with the general memory read instructions 31 to 33, the extended memory read instructions 131 to 133 respectively have functions of the general memory read instructions 31 to 33. All the extended memory read instructions 131 to 133 have the first semantic, and none of the general memory read instructions 31 to 33 has the first semantic.

Encoding formats and representation manners of different extended memory read instructions 13 are different. In a possible implementation, LDURBE1, LDURHE1, and LDURE1 represent the extended memory read instruction 131, the extended memory read instruction 132, and the extended memory read instruction 133 respectively. Alternatively, ER131, ER132, and ER133 represent the extended memory read instruction 131, the extended memory read instruction 132, and the extended memory read instruction 133 respectively, to distinguish between different extended memory read instructions 13.

The extended memory read instruction 14 is used to instruct to determine a storage address in the memory based on the unscaled immediate addressing mode, read a second byte quantity of data in the determined storage address to a fourth destination register, and fill a remaining bit of the fourth destination register with a sign bit of the read data, where the extended memory read instruction 14 further has the first semantic.

The extended memory read instruction 14 is a memory read instruction extended based on a function of the general memory read instruction 4. The extended memory read instruction 14 has the function of the general memory read instruction 4, and further has the first semantic. An instruction format of the extended memory read instruction 14 may be the same as or different from that of the general memory read instruction 4, but an encoding format of the extended memory read instruction 14 is different from that of the general memory read instruction 4.

As shown in Table 4, based on different values of the second byte quantity, the extended memory read instruction 14 includes at least one of the extended memory read instructions 141 to 143. The extended memory read instructions 141 to 143 are respectively memory read instructions newly added based on the general memory read instructions 31 to 33. In comparison with the general memory read instructions 31 to 33, the extended memory read instructions 141 to 143 respectively have functions of the general memory read instructions 31 to 33, and all the extended memory read instructions 141 to 143 have the first semantic, but none of the extended memory read instructions 31 to 33 has the first semantic.

Encoding formats and representation manners of different extended memory read instructions 14 are different. In a possible implementation, LDURSBE1, LDURSHE1, and LDURSWE1 represent the extended memory read instruction 141, the extended memory read instruction 142, and the extended memory read instruction 143 respectively. Alternatively, ER141, ER142, and ER143 represent the extended memory read instruction 141, the extended memory read instruction 142, and the extended memory read instruction 143 respectively, to distinguish between different extended memory read instructions 14.

It should be noted that, for each extended memory read instruction 1 and a corresponding general memory read instruction, each extended memory read instruction 1 is a memory read instruction newly added for the corresponding general memory read instruction, and further has a first semantic. Correspondingly, each extended memory read instruction 1 and the corresponding general memory read instruction correspond to different encoding formats. For example, a semantic bit is set in an encoding format corresponding to an extended memory read instruction 1, and a value of the semantic bit identifies the first semantic. However, a semantic bit may be set in an encoding format corresponding to the corresponding general memory read instruction, or no semantic bit may be set. If the semantic bit is set in the encoding format corresponding to the general memory read instruction, however, a value of the semantic bit is different from the value of the semantic bit in the encoding format corresponding to the extended memory read instruction 1, the value of the semantic bit does not identify the first semantic.

Herein, the extended memory write instruction 1 in the extended instruction set 1 is described as follows:

The extended memory write instruction 1 is used to instruct to determine a to-be-written storage address in the memory based on a supported addressing mode, and write a third byte quantity of data in a source register to the determined storage address, and the extended memory write instruction 1 further has a second semantic.

The extended memory write instruction 1 supports at least one of the immediate addressing mode, the label addressing mode, and the register addressing mode. For example, as shown in the following Table 5, based on different supported addressing modes, the extended memory write instruction 1 includes at least one of extended memory write instructions 11 and 12.

The following describes in detail a processing process of each instruction in Table 5.

The extended memory write instruction 11 is used to instruct to determine a storage address in the memory based on the supported addressing mode, and write a third byte quantity of data in the first source register to the determined storage address, and the extended memory write instruction 11 has the second semantic.

The extended memory write instruction 11 is a memory write instruction extended based on a function of the general memory write instruction 1. The extended memory read instruction 11 has the function of the general memory write instruction 1, and further has the second semantic. An instruction format of the extended memory write instruction 11 may be the same as or different from that of the general memory write instruction 1, but an encoding format of the extended memory write instruction 11 is different from that of the general memory write instruction 1.

As shown in Table 5, based on different values of the third byte quantity, the extended memory write instruction 11 includes at least one of the extended memory write instructions 111 to 113. The extended memory write instructions 111 to 113 are respectively memory write instructions newly added based on the general memory write instructions 11 to 13. In comparison with the general memory write instructions 11 to 13, the extended memory write instructions 111 to 113 respectively have functions of the general memory write instructions 11 to 13, and all the extended memory write instructions 111 to 113 further have the second semantic, but none of the general memory write instructions 11 to 13 has the second semantic.

Encoding formats and representation manners of different extended memory write instructions 11 are different. In a possible implementation, STRBE1, STRHE1, and STRE1 represent the extended memory write instruction 111, the extended memory write instruction 112, and the extended memory write instruction 113 respectively. Alternatively, EW111, EW112, and EW113 represent the extended memory write instruction 111, the extended memory write instruction 112, and the extended memory write instruction 113 respectively, to distinguish between different extended memory write instructions 11.

The extended memory write instruction 12 is used to instruct to determine a storage address in the memory based on the unscaled immediate addressing mode, and write a third byte quantity of data in a second source register to the

TABLE 5

| Instruction | Instruction | Instruction | Supported addressing mode | Third byte quantity | Semantic |
|---|---|---|---|---|---|
| Extended memory write instruction 1 | Extended memory write instruction 11 | Extended memory write instruction 111 | Scaled immediate addressing mode, label addressing mode, and register addressing mode | One byte | Second semantic |
| | | Extended memory write instruction 112 | | Two bytes | |
| | | Extended memory write instruction 113 | | Four bytes or eight bytes | |
| | Extended memory write instruction 12 | Extended memory write instruction 121 | Unscaled immediate addressing mode | One byte | |
| | | Extended memory write instruction 122 | | Two bytes | |
| | | Extended memory write instruction 123 | | Four bytes or eight bytes | | determined storage address, and the extended memory write instruction 12 has the second semantic.

The extended memory write instruction 12 is a memory write instruction extended based on a function of the general memory write instruction 2. The extended memory read instruction 12 has the function of the general memory write instruction 2, and further has the second semantic. An instruction format of the extended memory write instruction 12 may be the same as or different from that of the general memory write instruction 2, but an encoding format of the extended memory write instruction 12 is different from that of the general memory write instruction 2.

As shown in Table 5, based on different values of the third byte quantity, the extended memory write instruction 12 includes at least one of the extended memory write instructions 121 to 123. The extended memory write instructions 121 to 123 are respectively memory write instructions newly added based on the general memory write instructions 21 to 23. In comparison with the general memory write instructions 21 to 23, the extended memory write instructions 121 to 123 respectively have functions of the general memory write instructions 21 to 23, and all the extended memory write instructions 121 to 123 further have the second semantic, but none of the general memory write instructions 21 to 23 has the second semantic.

Encoding formats and representation manners of different extended memory write instructions 12 are different. In a possible implementation, STURBE1, STURHE1, and STURE1 represent the extended memory write instruction 121, the extended memory write instruction 122, and the extended memory write instruction 123 respectively. Alternatively, EW121, EW122, and EW123 represent the extended memory write instruction 121, the extended memory write instruction 122, and the extended memory write instruction 123 respectively, to distinguish between different extended memory write instructions 12.

It should be noted that, for each extended memory write instruction 1 and a corresponding general memory write instruction, each extended memory write instruction 1 is a memory write instruction newly added for the corresponding general memory write instruction, and further has a second semantic. Correspondingly, each extended memory write instruction 1 and the corresponding general memory write instruction correspond to different encoding formats. For example, a semantic bit is set in an encoding format corresponding to an extended memory write instruction 1, and a value of the semantic bit identifies the second semantic. However, a semantic bit may be set in an encoding format corresponding to the corresponding general memory write instruction, or no semantic bit may be set. If the semantic bit is set in the encoding format corresponding to the general memory write instruction, however, a value of the semantic bit is different from the value of the semantic bit in the encoding format corresponding to the extended memory write instruction 1, the value of the semantic bit does not identify the second semantic.

In a possible implementation, the extended instruction set 1 further includes at least one other function instruction, and the at least one other function instruction is for implementing a function other than memory access. The at least one other function instruction is not limited herein in this embodiment of this application.

Third Instruction Set: Extended Instruction Set 2

The extended instruction set 2 is another instruction set extended for the processor. In comparison with the extended instruction set 1, the extended instruction set 2 is an instruction set obtained through adding a special semantic (a first semantic or a second semantic) to a general memory read/write instruction (in other words, a general memory read instruction or a general memory write instruction) in the general instruction set, and the extended instruction set 1 is a new instruction set developed based on a function of the general memory read/write instruction in the general instruction set. To distinguish between the extended instruction set 1 and the extended instruction set 2, instructions in the extended instruction set 1 and the extended instruction set 2 correspond to different encoding formats.

As shown in Table 1, the extended memory read instruction 2 in the extended instruction set 2 has the first semantic, and the extended memory read instruction 2 is an instruction fetched through adding the first semantic to the general memory read instruction in the general instruction set of the processor. The extended memory write instruction 2 in the extended instruction set 2 is an instruction fetched through adding the second semantic to the general memory write instruction in the general instruction set. For example, the first semantic is added to the general memory read instruction in the general instruction set to fetch the extended memory read instruction 2, the second semantic is added to the general memory write instruction in the general instruction set to fetch the extended memory write instruction 2, the general memory read instruction in the general instruction set is replaced with the extended memory read instruction 2, and the general memory write instruction in the general instruction set is replaced with the extended memory write instruction 2, to obtain the extended instruction set 2.

The following separately describes the extended memory read instruction 2 and an extended memory write instruction 2. Herein, the extended memory read instruction 2 is first described as follows:

The extended memory read instruction 2 is used to instruct to determine a to-be-read storage address in a memory based on a supported addressing mode, and read a specific byte quantity of data in the storage address to a destination register, and the extended memory read instruction 2 further has the first semantic.

The extended memory read instruction 2 supports at least one of the immediate addressing mode, the label addressing mode, and the register addressing mode. For example, as shown in the following Table 6, based on different supported addressing modes and specific byte quantities, the extended memory read instruction 2 includes at least one of extended memory read instructions 21 to 24.

TABLE 6

| Instruction | Instruction | Instruction | Supported addressing mode | Specific byte quantity | | Semantic |
| | | | | First byte quantity | Second byte quantity | |
|---|---|---|---|---|---|---|
| Extended memory read instruction 2 | Extended memory read instruction 21 | Extended memory read instruction 211 | Scaled immediate addressing mode, label addressing mode, and register addressing mode | One byte | / | First semantic |
| | | Extended memory read instruction 212 | | Two bytes | / | |
| | | Extended memory read instruction 213 | | Four bytes or eight bytes | / | |
| | Extended memory read instruction 22 | Extended memory read instruction 221 | Scaled immediate addressing mode, label addressing mode, and register addressing mode | / | One byte | |
| | | Extended memory read instruction 222 | | / | Two bytes | |
| | | Extended memory read instruction 223 | | / | Four bytes | |
| | Extended memory read instruction 23 | Extended memory read instruction 231 | Unscaled immediate addressing mode | One byte | / | |
| | | Extended memory read instruction 232 | | Two bytes | / | |
| | | Extended memory read instruction 233 | | Four bytes or eight bytes | / | |
| | Extended memory read instruction 24 | Extended memory read instruction 241 | Unscaled immediate addressing mode | | One byte | |
| | | Extended memory read instruction 242 | | | Two bytes | |
| | | Extended memory read instruction 243 | | | Four bytes | |

"/" in Table 6 represents none.

The following describes in detail a processing process of each instruction in Table 6.

The extended memory read instruction 21 is used to instruct to determine a storage address in the memory based on the supported addressing mode, and read a first byte quantity of data in the determined storage address to a first destination register, and the extended memory read instruction 21 further has the first semantic.

The extended memory read instruction 21 is an instruction fetched through adding the first semantic to the general memory read instruction 1. An instruction format of the extended memory read instruction 21 is the same as that of the general memory read instruction 1, but an encoding format corresponding to the extended memory read instruction 21 is different from that corresponding to the general memory read instruction 1.

As shown in Table 6, based on different values of the first byte quantity, the extended memory read instruction 21 includes at least one of the extended memory read instructions 211 to 213. The extended memory read instructions 211 to 213 are respectively memory read instructions fetched through adding the first semantic to the general memory read instructions 11 to 13. In comparison with the general memory read instructions 11 to 13, the extended memory read instructions 211 to 213 respectively have functions of the general memory read instructions 11 to 13, and all the extended memory read instructions 211 to 213 have the first semantic, but none of the general memory read instructions 11 to 13 has the first semantic.

Encoding formats and representation manners of different extended memory read instructions 21 are different. In a possible implementation, LDRBE2, LDRHE2, and LDRE2 represent the extended memory read instruction 211, the extended memory read instruction 212, and the extended memory read instruction 213 respectively. Herein, "E2" is an extension form of a general extended memory read instruction. Alternatively, ER211, ER212, and ER213 represent the extended memory read instruction 211, the extended memory read instruction 212, and the extended memory read instruction 213 respectively, to distinguish between different extended memory read instructions 21.

The extended memory read instruction 22 is used to instruct to determine a storage address in the memory based on the supported addressing mode, read a second byte quantity of data in the determined storage address to a second destination register, and fill a remaining bit of the second destination register with a sign bit of the read data, where the extended memory read instruction 22 further has the first semantic.

The extended memory read instruction 22 is an instruction fetched through adding the first semantic to the general memory read instruction 2. An instruction format of the extended memory read instruction 22 is the same as that of the general memory read instruction 2, but an encoding format corresponding to the extended memory read instruction 22 is different from that corresponding to the general memory read instruction 2.

As shown in Table 6, based on different values of the second byte quantity, the extended memory read instruction 22 includes at least one of the extended memory read instructions 221 to 223. The extended memory read instructions 221 to 223 are instructions fetched through adding the first semantic to the general memory read instructions 21 to 23 respectively. In comparison with the general memory read instructions 21 to 23, the extended memory read instructions 221 to 223 respectively have functions of the general memory read instructions 21 to 23, and all the extended memory read instructions 221 to 223 have the first semantic, but none of the general memory read instructions 21 to 23 has the first semantic.

Encoding formats and representation manners of different extended memory read instructions 23 are different. In a possible implementation, LDRSBE2, LDRSHE2, and LDR-SWE2 represent the extended memory read instruction 221, the extended memory read instruction 222, and the extended memory read instruction 223 respectively. Alternatively, ER221, ER222, and ER223 represent the extended memory read instruction 221, the extended memory read instruction 222, and the extended memory read instruction 223 respectively, to distinguish between different extended memory read instructions 22.

The extended memory read instruction 23 is used to instruct to determine a storage address in the memory based on the unscaled immediate addressing mode, and read a first byte quantity of data in the determined storage address to a third destination register, and the extended memory read instruction 23 further has the first semantic.

The extended memory read instruction 23 is an instruction fetched through adding the first semantic to the general memory read instruction 3. An instruction format of the extended memory read instruction 23 is the same as that of the general memory read instruction 3, but an encoding format of the extended memory read instruction 23 is different from that of the general memory read instruction 3.

As shown in Table 6, based on different values of the first byte quantity, the extended memory read instruction 23 includes at least one of the extended memory read instructions 231 to 233. The extended memory read instructions 231 to 233 are instructions fetched through adding the first semantic to the general memory read instructions 31 to 33 respectively. In comparison with the general memory read instructions 31 to 33, the extended memory read instructions 231 to 233 respectively have functions of the general memory read instructions 31 to 33, and all the extended memory read instructions 231 to 233 have the first semantic, but none of the general memory read instructions 31 to 33 has the first semantic.

Encoding formats and representation manners of different extended memory read instructions 23 are different. In a possible implementation, LDURBE2, LDURHE2, and LDURE2 represent the extended memory read instruction 231, the extended memory read instruction 232, and the extended memory read instruction 233 respectively. Alternatively, ER231, ER132, and ER233 represent the extended memory read instruction 231, the extended memory read instruction 232, and the extended memory read instruction 233 respectively, to distinguish between different extended memory read instructions 23.

The extended memory read instruction 24 is used to instruct to determine a storage address in the memory based on the unscaled immediate addressing mode, read a second byte quantity of data in the determined storage address to a fourth destination register, and fill a remaining bit of the fourth destination register with a sign bit of the read data, where the extended memory read instruction 24 further has the first semantic.

The extended memory read instruction 24 is an instruction fetched through adding the first semantic to the general memory read instruction 4. An instruction format of the extended memory read instruction 24 is the same as that of the general memory read instruction 4, but an encoding format of the extended memory read instruction 24 is different from that of the general memory read instruction 4.

As shown in Table 6, based on different values of the second byte quantity, the extended memory read instruction 24 includes at least one of the extended memory read instructions 241 to 243. The extended memory read instructions 241 to 243 are instructions fetched through adding the first semantic to the general memory read instructions 41 to 43 respectively. In comparison with the general memory read instructions 41 to 43, the extended memory read instructions 241 to 243 respectively have functions of the general memory read instructions 41 to 43, and all the extended memory read instructions 241 to 243 have the first semantic, but none of the general memory read instructions 41 to 43 has the first semantic.

Encoding formats and representation manners of different extended memory read instructions 24 are different. In a possible implementation, LDURSBE2, LDURSHE2, and LDURSWE2 represent the extended memory read instruction 241, the extended memory read instruction 242, and the extended memory read instruction 243 respectively. Alternatively, ER241, ER242, and ER243 represent the extended memory read instruction 241, the extended memory read instruction 242, and the extended memory read instruction 243 respectively, to distinguish between different extended memory read instructions 24.

Herein, the extended memory write instruction 2 in the extended instruction set 2 is described as follows:

The extended memory write instruction 2 is used to instruct to determine a to-be-written storage address in the memory based on the supported addressing mode, and writes a third byte quantity of data in a source register to the determined storage address, and the extended memory write instruction 2 further has the second semantic.

The extended memory write instruction 2 supports at least one of the immediate addressing mode, the label addressing mode, and the register addressing mode. For example, as shown in the following Table 7, based on different supported addressing modes, the extended memory write instruction 2 includes at least one of extended memory write instructions 21 and 22.

TABLE 7

| Instruction | Instruction | Instruction | Supported addressing mode | Third byte quantity | Semantic |
|---|---|---|---|---|---|
| Extended memory write instruction 2 | Extended memory write instruction 21 | Extended memory write instruction 211 | Scaled immediate addressing mode, label addressing mode, and register addressing mode | One byte | Second semantic |
| | | Extended memory write instruction 212 | | Two bytes | |
| | | Extended memory write instruction 213 | | Four bytes or eight bytes | |
| | Extended memory write instruction 22 | Extended memory write instruction 221 | Unscaled immediate addressing mode | One byte | |
| | | Extended memory write instruction 222 | | Two bytes | |
| | | Extended memory write instruction 223 | | Four bytes or eight bytes | |

The following describes in detail a processing process of each instruction in Table 7.

The extended memory write instruction 21 is used to instruct to determine a storage address in the memory based on the supported addressing mode, and write a third byte quantity of data in a first source register to the determined storage address, and the extended memory write instruction 21 further has the second semantic.

The extended memory write instruction 21 is an instruction fetched through adding the second semantic to the general memory write instruction 1. An instruction format of the extended memory write instruction 21 is the same as that of the general memory write instruction 1, but an encoding format of the extended memory write instruction 21 is different from that of the general memory write instruction 1.

As shown in Table 7, based on different values of the third byte quantity, the extended memory write instruction 21 includes at least one of the extended memory write instructions 211 to 213. The extended memory write instructions 211 to 213 are instructions fetched through adding second semantic to the general memory write instructions 11 to 13 respectively. In comparison with the general memory write instructions 11 to 13, the extended memory write instructions 211 to 213 respectively have functions of the general memory write instructions 11 to 13, and all the extended memory write instructions 211 to 213 have the second semantic, but none of the general memory write instructions 11 to 13 has the second semantic.

Encoding formats and representation manners of different extended memory write instructions 21 are different. In a possible implementation, STRBE2, STRHE2, and STRE2 represent the extended memory write instruction 211, the extended memory write instruction 212, and the extended memory write instruction 213 respectively. Alternatively, EW211, EW212, and EW213 represent the extended memory write instruction 211, the extended memory write instruction 212, and the extended memory write instruction 213 respectively, to distinguish between different extended memory write instructions 21.

The extended memory write instruction 22 is used to instruct to determine a storage address in the memory based on the unscaled immediate addressing mode, and write a third byte quantity of data in a second source register to the determined storage address, and the extended memory write instruction 22 has the second semantic.

The extended memory write instruction 22 is an instruction fetched through adding the second semantic to the general memory write instruction 2. An instruction format of the extended memory write instruction 22 is the same as that of the general memory write instruction 2, but an encoding format of the extended memory write instruction 22 is different from that of the general memory write instruction 2.

As shown in Table 7, based on different values of the third byte quantity, the extended memory write instruction 22 includes at least one of the extended memory write instructions 221 to 223. The extended memory write instructions 221 to 223 are instructions fetched through adding the second semantic to the general memory write instructions 21 to 23 respectively. In comparison with the general memory write instructions 21 to 23, the extended memory write instructions 221 to 223 respectively have functions of the general memory write instructions 21 to 23, and all the extended memory write instructions 221 to 223 have the second semantic, but none of the general memory write instructions 21 to 23 has the second semantic.

Encoding formats and representation manners of different extended memory write instructions 22 are different. In a possible implementation, STURBE2, STURHE2, and STURE2 represent the extended memory write instruction 221, the extended memory write instruction 222, and the extended memory write instruction 223 respectively. Alternatively, EW221, EW222, and EW223 represent an extended memory write instruction 221, the extended memory write instruction 222, and the extended memory write instruction 223 respectively, to distinguish between different extended memory write instructions 22.

In a possible implementation, the extended instruction set 2 further includes at least one other function instruction, and the at least one other function instruction is for implementing a function other than memory access. The at least one other function instruction is not limited herein in this embodiment of this application.

It should be noted that processors of different architectures support different general instruction sets, extended instruction sets 1, and extended instruction sets 2, and correspondingly, memory read/write instructions (to be specific, general memory read instructions, general memory write instructions, extended memory read instructions, or extended memory write instructions) in different instruction sets have different encoding formats and representation manners. Herein, an encoding format and a representation manner of each memory read/write instruction in various instruction sets supported by the processor of the first computing device are not limited in this embodiment of this application.

The general instruction set, the extended instruction set 1, and the extended instruction set 2 are all instruction sets supported by the processor of the first computing device. The second computing device can compile the application source program into the application program by using the general instruction set, the extended instruction set 1, or the extended instruction set 2, so that the processor of the first computing device can identify and execute the application program. To further reflect a process in which the second computing device compiles the application source program by using the instruction set supported by the processor of the first computing device and a process in which the first computing device executes the application program, refer to a flowchart of a data processing method according to an embodiment of this application shown in FIG. 2.

201: A second computing device displays a compilation interface, where the compilation interface is for providing a compilation function for a processor of a target type.

The processor of the target type includes a processor of the first computing device. The compilation function includes compiling an application program that can be identified and executed by the processor. An order of accessing a memory when the processor of the target type supports execution of the application program is inconsistent with an arrangement sequence of read/write instructions in the application program. Alternatively, it may be understood as that the processor of the target type supports a weak memory model, for example, a processor of an ARM64 architecture or a processor of a POWER architecture.

The compilation interface is provided by compilation software deployed in the second computing device, and the second computing device displays the compilation interface through running the compilation software. For example, the second computing device runs the compilation software, and displays a main interface of the compilation software. The main interface includes a processor selection box, the processor selection box is for providing at least one processor option, and each processor option corresponds to one type of processor. A second user performs a selection operation on a processor option that corresponds to the processor of the target type and that is in the processor selection box, and the second computing device displays the compilation interface in response to an selection operation performed on the processor option.

202: The second computing device compiles the application source program in response to a compilation operation performed on the application source program in the compilation interface, to obtain the application program, where the application program includes an instruction sequence, the instruction sequence includes a plurality of instructions, and the plurality of instructions include read/write instructions for performing a read operation or a write operation on the memory.

The memory is a memory of a computing device that executes the application program. For example, if the application program is executed by a first computing device other than the second computing device, the memory is a memory of the first computing device. The application source program is any source code for implementing a customized function, the application program is a compilation result of the application source program, and the processor of the target type can identify and run the application program.

In a possible implementation, the application source program is an application source program developed for a processor that supports a non-weak memory model, where the non-weak memory model includes a total store ordering (total store ordering, TSO) model, and all cores (cores) in the processor that supports the TSO model have and have only one global sequence for performing a read/write operation on the memory.

The compilation interface includes a compilation option, and the compilation option is for providing a function of compiling the application source program. The second user performs a selection operation on the compilation option, to implement the compilation operation on the application source program. The second computing device compiles, in response to the compilation operation performed on the application source program in the compilation interface, the application source program by using an instruction set provided for the processor, to obtain the application program.

The instruction set provided by the compilation software in the second computing device for the processor includes at least one of a general instruction set, a first extended instruction set, and a second extended instruction set, where the first extended instruction set is the foregoing extended instruction set 1, and the second extended instruction set is the foregoing extended instruction set 2.

When the instruction set provided for the processor includes one of the general instruction set, the first extended instruction set, and the second extended instruction set, the second computing device compiles, in response to the compilation operation performed on the application source program, the application source program by using an instruction set provided for the processor, to obtain the application program.

For example, when the instruction set provided by the compilation software for the processor is the general instruction set, the second computing device compiles, in response to the compilation operation performed on the application source program, the application source program by using the general instruction set, to obtain the application program. In this case, a read instruction in the application program is fetched through compiling a general memory read instruction in the general instruction set, and a write instruction in the application program is fetched through compiling a general memory write instruction in the general instruction set.

For another example, when the compilation software provides an extended instruction set (the first extended instruction set or the second extended instruction set) for the processor, the second computing device compiles, in response to the compilation operation performed on the application source program, the application source program by using the extended instruction set, to obtain the application program. In this case, a read instruction in the application program is fetched through compiling an extended memory read instruction in the extended instruction set, and a write instruction in the application program is fetched through compiling an extended memory write instruction in the extended instruction set.

When the instruction set provided for the processor includes a plurality of instruction sets of the general instruction set, the first extended instruction set, and the second extended instruction set, the second user selects an instruction set, and the second computing device compiles, in response to the compilation operation performed on the application source program, the application source program by using the instruction set selected by the second user, to obtain the application program. For example, there are three cases:

Case 1: When the instruction set provided for the processor includes the general instruction set and an extended instruction set, the compilation interface further includes an instruction set option, and the instruction set option is for providing the extended instruction set.

If the second user performs a selection operation on the instruction option and the selection operation on the compilation option, the second computing device compiles, in response to the selection operation performed on the instruction option and the selection operation performed on the compilation option, the application source program by using the extended instruction set, to obtain the application program. If the extended instruction set is the first extended instruction set, a read instruction in the application program is fetched through compiling an extended memory read instruction in the first extended instruction set, and a write instruction in the application program is fetched through compiling an extended memory write instruction in the first extended instruction set. If the extended instruction set is the second extended instruction set, a read instruction in the application program is fetched through compiling an extended memory read instruction in the second extended instruction set, and a write instruction in the application program is fetched through compiling a second extended memory write instruction in the second extended instruction set.

Alternatively, the instruction set option in the compilation interface includes a first instruction set option and a second instruction set option, where the first instruction set option is for providing the first extended instruction set, and the second instruction set option is for providing the second extended instruction set. If the second user performs a selection operation on the first instruction set option and the selection operation on the compilation option, the second computing device compiles, in response to the selection operation performed on the first instruction set option and the selection operation performed on the compilation option, the application source program by using the first extended instruction set, to obtain the application program. If the second user performs a selection operation on the second instruction set option and the selection operation on the compilation option, the second computing device compiles, in response to the selection operation performed on the second instruction set option and the selection operation performed on the compilation option, the application source program by using the second extended instruction set, to obtain the application program.

Case 2: When the instruction set provided for the processor includes the first extended instruction set and the second extended instruction set, the compilation interface further includes a first instruction set option but does not include a second instruction set option.

If the second user performs a selection operation on the first instruction set option and the selection operation on the compilation option, the second computing device compiles, in response to the selection operation performed on the first instruction set option and the selection operation performed on the compilation option, the application source program by using the first extended instruction set, to obtain the application program.

If the second user performs no selection operation on the first instruction set option, but performs the selection operation on the compilation option, the second computing device compiles, in response to the selection operation performed on the compilation option, the application source program by using the second extended instruction set, to obtain the application program.

Case 3: When the instruction set provided for the processor includes the first extended instruction set and the second extended instruction set, an instruction set option in the compilation interface includes a first instruction set option and a second instruction set option.

If the second user performs a selection operation on the first instruction set option and the selection operation on the compilation option, the second computing device compiles, in response to the selection operation performed on the first instruction set option and the selection operation performed on the compilation option, the application source program by using the first extended instruction set, to obtain the application program.

If the second user performs a selection operation on the second instruction set option and the selection operation on the compilation option, the second computing device compiles, in response to the selection operation performed on the second instruction set option and the selection operation performed on the compilation option, the application source program by using the second extended instruction set, to obtain the application program.

203: The second computing device sends the application program to the first computing device.

It should be noted that the second computing device sends the application program to the first computing device only once, and does not need to send the application program for a plurality of times.

204: The first computing device receives the application program.

After receiving the application program, the first computing device stores the application program, for example, stores the application program in a computer-readable storage medium of the first computing device. After a first user delivers a deployment command for the application program to the first computing device, if the first computing device deploys the application program in response to the deployment command for the application program, it may also be understood as installing the application program.

205: The processor of the first computing device obtains the instruction sequence of the application program.

The instruction sequence is a segment of instruction sequence of the application program, or the application program.

In a possible implementation, if the first user delivers, to the first computing device, an execution command for the instruction sequence of the application program, the first computing device obtains the instruction sequence of the application program in response to the execution command for the instruction sequence.

If the instruction sequence is the segment of instruction sequence of the application program, and the instruction sequence is for implementing at least one function of the application program, an operation of enabling the at least one function by the first user on the first computing device is the execution command delivered to the first computing device. If the instruction sequence is the entire application program, an operation of opening the application program by the first user on the first computing device is the execution command delivered to the first computing device.

The instruction sequence includes the plurality of instructions that are sequentially arranged. For example, the instruction sequence includes 100 instructions, and the 100 instructions are sequentially arranged from 1 to 100.

Correspondingly, when obtaining the instruction sequence, the first computing device also sequentially obtains the instruction sequence. The example in which the instruction sequence includes the 100 instructions is still used. The first computing device first fetches the $1^{st}$ instruction in the 100 instructions, then fetches the $2^{nd}$ instruction in the 100 instructions. The rest may be deduced by analogy, until the last instruction in the 100 instructions is fetched.

Alternatively, it may be understood as that the processor sequentially reads the instructions in the instruction sequence, to obtain the read instruction sequence. The example in which the instruction sequence includes the 100 instructions is still used. The first computing device first reads the $1^{st}$ instruction in the 100 instructions, then reads the $2^{nd}$ instruction in the 100 instructions. The rest may be deduced by analogy, until the last instruction in the 100 instructions is read, and the read 100 instructions form the instruction sequence.

206: The processor identifies an execution sequence of the read/write instructions based on the instruction sequence.

After obtaining the instruction sequence, the processor sequentially identifies the plurality of instructions in the instruction sequence. For ease of description, an example in which one instruction in the plurality of instructions is identified is for describing step 206 as follows:

Each memory read/write instruction in each instruction set of the processor corresponds to one encoding format, and one read/write instruction in the application program is fetched through encoding in an encoding format corresponding to one memory read/write instruction in the instruction set.

When identifying whether an instruction in the plurality of instructions is a read/write instruction, the processor determines whether a sequence of characters in the instruction complies with an encoding format corresponding to the read/write instruction. If the sequence of the characters in the instruction complies with the encoding format corresponding to the read/write instruction, the instruction is identified as the read/write instruction; or if the sequence of the characters in the instruction does not comply with the encoding format corresponding to the read/write instruction, the instruction is not identified as the read/write instruction.

When the instruction is identified as a read instruction in the read/write instruction, the processor parses the instruction based on an encoding format corresponding to the read instruction, to parse out an operand from the instruction, and determines an address of a destination register and a source storage address in the memory based on the operand that is parsed out. In this case, the destination register is a register for storing to-be-read data, and the source storage address is an address that is in the memory and at which the to-be-read data is stored.

When the instruction is identified as a write instruction in the read/write instruction, the processor parses the instruction based on an encoding format corresponding to the write instruction, to parse out an operand from the instruction, and determines an address of a source register and a destination storage address in the memory based on the operand that is parsed out. In this case, the source register is a register for storing to-be-written data, and the destination storage address is an address that is in the memory and at which the to-be-written data is stored.

After identifying any read/write instruction, the processor identifies an arrangement sequence number of the read/write instruction in the instruction sequence as an execution sequence number of the read/write instruction. In a possible implementation, the processor operates in a sequential memory access mode, where the sequential memory access mode is an operating mode in which the processor accesses the memory, and the sequential memory access mode is also referred to as an "ordered" mode. The sequential memory access mode requires that the execution sequence of the read/write instructions be consistent with the arrangement sequence of the read/write instructions in the instruction sequence. After identifying a read/write instruction, the processor identifies an arrangement sequence number of the read/write instruction in the instruction sequence number as an execution sequence of the read/write instruction based on the sequential memory access mode.

The processor sequentially identifies and parses each instruction in the instruction sequence starting from the $1^{st}$ instruction in the instruction sequence. Therefore, an identification sequence number and a decoding sequence number of each instruction in the instruction sequence number are both an arrangement sequence of the corresponding instruction in the instruction sequence. In this way, when identifying an execution sequence of each read/write instruction based on the instruction sequence, the processor identifies an identification sequence number or a decoding sequence number of each read/write instruction as the execution sequence number of the corresponding read/write instruction.

In a possible implementation, after identifying any read/write instruction, the processor further allocates a register to the read/write instruction, so that when the read/write instruction is subsequently executed, a read/write operation can be performed on the memory based on the allocated register.

For example, after identifying the read instruction for performing the read operation on the memory, the processor queries, based on the address that is parsed out and that is of the destination register, whether the destination register is in an idle state. If the destination register is in the idle state, the processor allocates the destination register to the read operation corresponding to the read instruction; or if the destination register is not in the idle state, the processor uses another register in the idle state as a destination register, and allocates the destination register to the read operation corresponding to the read instruction.

For another example, after identifying the write instruction for performing the write operation on the memory, the processor queries, based on the address that is parsed out and that is of the source register, whether the source register is in an idle state. If the source register is in the idle state, the processor allocates the source register to the write operation corresponding to the write instruction; or if the source register is not in the idle state, the processor uses another register in the idle state as a source register, and allocates the source register to the write operation corresponding to the write instruction.

207: The processor executes the read/write instructions based on the execution sequence of the read/write instructions.

Because the execution sequence of the read/write instructions is the arrangement sequence of the read/write instructions in the instruction sequence, when executing an read/write instruction based on the execution sequence of the read/write instructions, the processor first executes an instruction that is arranged before the read/write instruction in the instruction sequence, then executes the read/write instruction, and then executes an instruction that is arranged after the read/write instruction in the instruction sequence, to implement sequential execution of the read/write instruction in the instruction sequence. This ensures consistency of memory access by the processor.

If the application source program of the application program is developed for a processor that supports the non-weak memory model, an arrangement of read/write instructions in the application program meets a requirement of the non-weak memory model on the execution sequence of the read/write instructions. If the application program is executed by the processor that supports the non-weak memory model, an execution sequence of the read/write instructions in the application program is not exchanged, to maintain memory consistency of the read/write operation on the memory. Therefore, to run the application program normally, the memory consistency of the read/write operation on the memory needs to be maintained. However, when the processor of the first computing device supports execution of the application program, a memory access order is inconsistent with the arrangement sequence of the read/write instructions in the application program. In a conventional technology, when executing the application program, the processor of the first computing device may exchange the execution sequence of the read/write instructions in the application program. Consequently, a memory consistency problem occurs, and the application program cannot be run normally. However, in this embodiment of this application, the processor of the first computing device identifies the arrangement sequence of the read/write instructions in the instruction sequence as the execution sequence of the read/write instructions, and sequentially executes the read/write instructions in the instruction sequence, so that the memory consistency problem can be avoided, and the application program can be run normally.

When executing an identified read instruction, the processor performs a read operation on the memory based on a destination register allocated to a corresponding read operation. For example, the processor reads data from a source storage address based on an address of the destination register allocated to the corresponding read operation and the source storage address that is parsed out from the read instruction, and stores the read data in the destination register, to perform the read operation on the source storage address of the memory.

When executing any identified write instruction, the processor performs a write operation on the memory based on a source register allocated to a corresponding write operation. For example, the processor obtains data from the source register based on an address of the source register allocated to the corresponding write operation and a destination storage address in the memory that is parsed out from the write instruction, and stores the obtained data in the destination storage address, to perform the write operation on the destination storage address of the memory.

According to the method provided in this embodiment of this application, the processor obtains the instruction sequence of the application program, identifies the execution sequence of the read/write instructions in the instruction sequence based on the instruction sequence, and executes the read/write instructions based on the identified execution sequence, to access the memory of the computing device, so that the processor can normally execute the application program. Correspondingly, a bad case such as a random crash, a restart, or an incorrect execution result of the application program is reduced, and reliability of the processor is increased, to further improve goodwill and market sales of the processor.

Figure 3:
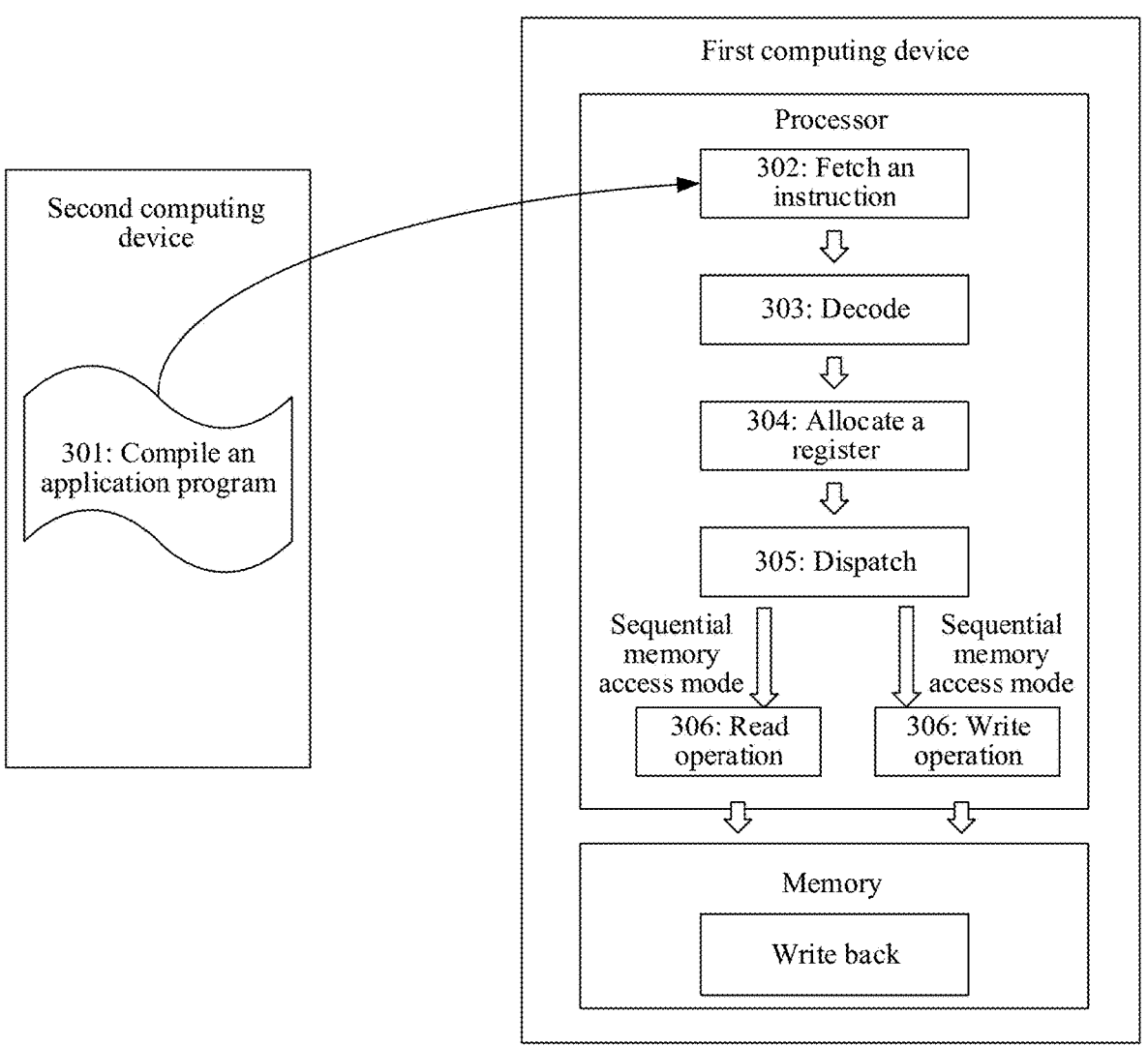
FIG. 3 is a schematic diagram of a data processing process of a processor according to an embodiment of this application.

To further describe the process shown in steps 204 to 207, refer to a schematic diagram of a data processing process of a processor according to an embodiment of this application shown in FIG. 3. The process includes the following steps 301 to 306.

301: A second computing device compiles an application source program by using compilation software, to obtain an application program that can be executed by the processor of a first computing device.

302: After the first computing device obtains the application program, the processor of the first computing device fetches an instruction (instruction fetch) from the application program.

For example, the processor sequentially reads a plurality of instructions in the application program based on an arrangement sequence of the instructions in the application program.

303: The processor decodes (decode) the plurality of instructions.

In a possible implementation, the processor includes a core and a decoder. The core transmits the plurality of instructions to the decoder, and the decoder decodes the plurality of instructions.

For example, the decoder identifies a read instruction and a write instruction in the plurality of instructions. The decoder parses out a source storage address and an address of a destination register from the read instruction, and uses the source storage address and the address of the destination register as a parsing result of the read instruction. If the read instruction further includes a read micro-operation, the decoder can further parse out the read micro-operation from the read instruction, and use the source storage address, the address of the destination register, and the read micro-operations as a decoding result of the read instruction. The read micro-operation is an operation that assists in completing a read operation on a memory, for example, an operation such as data check.

The decoder parses out an address of a source register and a destination storage address from the write instruction, and uses the address of the source register and the destination storage address as a parsing result of the write instruction. If the write instruction further includes a write micro-operation, the decoder can further parse out the write micro-operation from the write instruction, and use the address of the source register, the destination storage address, and the write micro-operation as a decoding result of the write instruction. The write micro-operation is an operation that assists in completing a write operation on the memory, for example, an operation such as data check.

After obtaining parsing results of the plurality of instructions, the decoder returns the parsing results of the plurality of instructions to the core.

304: The processor allocates a register to a corresponding read/write operation based on the parsing result of a read/write instruction.

After the core of the processor receives the parsing result of the read instruction, the core of the processor obtains the address of the destination register from the parsing result of the read instruction, and queries whether the destination register is in an idle state. If the destination register is in the idle state, the processor allocates the destination register to a read operation corresponding to the read instruction; or if the destination register is not in an idle state, the processor uses another register in the idle state as a destination register, and allocates the another register to a read operation corresponding to the read instruction, to implement register renaming (register rename).

After the core of the processor receives the parsing result of the write instruction, the core of the processor obtains the address of the source register from the parsing result of the write instruction, and queries whether the source register is in an idle state. If the source register is in the idle state, the processor allocates the source register to a write operation corresponding to the write instruction; or if the source register is not in an idle state, the processor uses another register in the idle state as a source register, and allocates the another register to a write operation corresponding to the write instruction, to implement register renaming.

305: The core of the processor dispatches (dispatch) the read operation and the write operation to a load & store unit.

In a possible implementation, the processor further includes the load & store unit (load & store unit, LSU), and the load & store unit is configured to process the read/write operation on the memory. After allocating the registers to the read instruction and the write instruction, the core of the processor dispatches, to the LSU, the read operation instructed by the read instruction and the write operation instructed by the write instruction. If the read operation further includes a read micro-operation, and the write operation further includes a write micro-operation, the core further dispatches the read micro-operation in the parsing result of the read instruction and the write micro-operation in the parsing result of the write instruction to the LSU.

306: The load & store unit uses a sequential memory access mode (ordered) to perform the read operation and the write operation.

In a possible implementation, when performing the read operation or the write operation on the memory in the sequential memory access mode, the load & store unit performs the read operation or the write operation on the memory in a write-back (write back) manner. It is clear that the load & store unit may alternatively perform the read operation and the write operation on the memory in another manner.

According to the method provided in this embodiment of this application, the processor obtains an instruction sequence of the application program, and executes the read/write instruction in the instruction sequence in the sequential memory access mode, to access the memory of the computing device. Therefore, a memory consistency problem can be avoided, so that the processor can normally execute the application program. Correspondingly, a bad case such as a random crash, a restart, or an incorrect execution result of the application program is reduced, and reliability of the processor is increased, to further improve goodwill and market sales of the processor.

Figure 2:
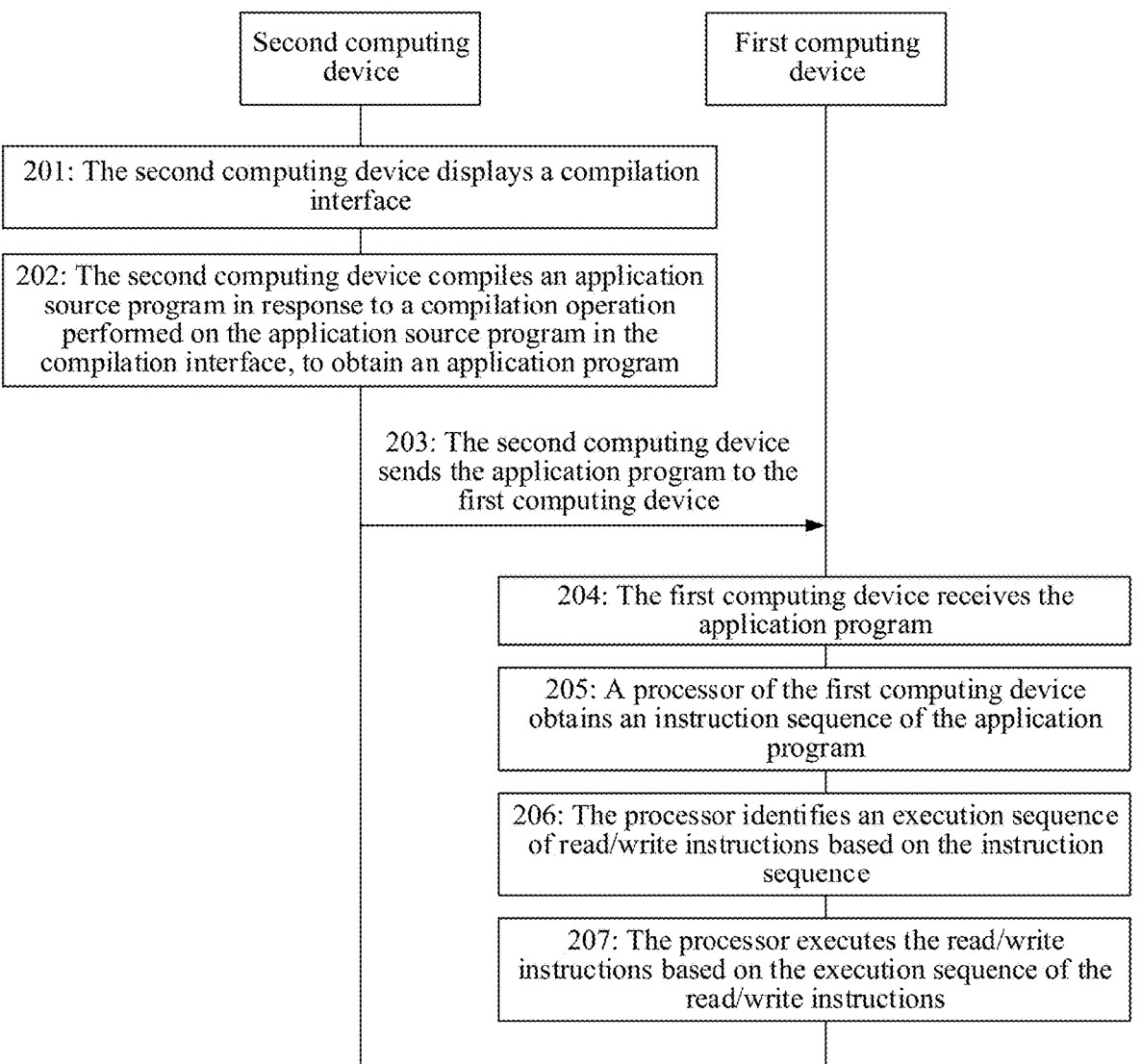
FIG. 2 is a flowchart of a data processing method according to an embodiment of this application.

It should be noted that the data processing processes shown in FIG. 2 and FIG. 3 are described by using an example in which the second computing device compiles the application source program and the first computing device executes the application program compiled by the second computing device. In another possible implementation, the application source program does not need to be compiled by the second computing device, but is compiled by the first computing device and the first computing device executes the compiled application program. In this case, the first computing device performs the foregoing steps 201 to 204 and 205 to 207.

The foregoing describes the data processing method provided in this application with reference to FIG. 1 to FIG. 3. The following describes an apparatus and a computing device in embodiments of this application by using FIG. 4 and FIG. 5 as an example.

Figure 4:
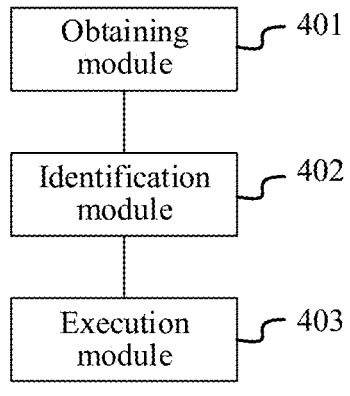
FIG. 4 is a schematic diagram of a structure of a data processing apparatus 400 according to an embodiment of this application.

Refer to FIG. 4. An embodiment of this application provides a schematic diagram of a structure of a data processing apparatus 400. The data processing apparatus 400 is configured as a processor of a computing device. A case in which a memory access order is inconsistent with an arrangement sequence of read/write instructions in an application program when the application program is executed is supported by the processor. The read/write instructions are instructions for performing a read/write operation on a memory. The apparatus 400 includes:

an obtaining module 401, configured to obtain an instruction sequence of the application program, where the instruction sequence includes a plurality of instructions, the plurality of instructions include the read/write instructions for performing a read operation or a write operation on the memory of the computing device, and the application program is deployed in the computing device;

an identification module 402, configured to identify an execution sequence of the read/write instructions based on the instruction sequence; and an execution module 403, configured to execute the read/write instructions based on the execution sequence.

In a possible implementation, the identification module 402 is configured to:

identify the arrangement sequence of the read/write instructions in the instruction sequence as the execution sequence of the read/write instructions.

In a possible implementation, the identification module 402 is configured to: identify, in a sequential memory access mode, an arrangement sequence of the read/write instructions in the instruction sequence as the execution sequence of the read/write instructions, where the sequential memory access mode requires that the execution sequence of the read/write instructions be consistent with the arrangement sequence of the read/write instructions in the instruction sequence.

In a possible implementation, the read/write instruction includes a read instruction for performing the read operation on the memory or a write instruction for performing the write operation on the memory, the read instruction has a first semantic, and the write instruction has a second semantic.

The first semantic indicates that a first instruction in the instruction sequence is executed after the read instruction is executed, the second semantic indicates that a second instruction in the instruction sequence is executed before execution of the write instruction is completed, the first instruction is arranged after the read instruction in the instruction sequence, and the second instruction is arranged before the write instruction in the instruction sequence.

In a possible implementation, the read instruction is fetched through compiling an extended memory read instruction, the extended memory read instruction has the first semantic, and the extended memory read instruction is an instruction that is added to an instruction set of the processor and that is used to instruct to read memory data.

The write instruction is fetched through compiling an extended memory write instruction, the extended memory write instruction has the second semantic, and the extended memory write instruction is an instruction that is added to the instruction set and that is used to instruct to write the memory data.

In a possible implementation, the extended memory read instruction includes at least one of a first extended memory read instruction, a second extended memory read instruction, a third extended memory read instruction, and a fourth extended memory read instruction, and the extended memory write instruction includes at least one of a first extended memory write instruction and a second extended memory write instruction. None of addressing modes supported by the first extended memory read instruction, the second extended memory read instruction, and the first extended memory write instruction includes an unscaled immediate addressing mode, and all of the third extended memory read instruction, the fourth extended memory read instruction, and the second extended memory write instruction support the unscaled immediate addressing mode.

The first extended memory read instruction is used to instruct to determine a storage address in the memory based on a supported addressing mode, and read a first byte quantity of data in the determined storage address to a first destination register.

The second extended memory read instruction is used to instruct to determine a storage address in the memory based on a supported addressing mode, read a second byte quantity of data in the determined storage address to a second destination register, and fill a remaining bit of the second destination register with a sign bit of the read data.

The third extended memory read instruction is used to instruct to determine a storage address in the memory based on the unscaled immediate addressing mode, and read a first byte quantity of data in the determined storage address to a third destination register.

The fourth extended memory read instruction is used to instruct to determine a storage address in the memory based on the unscaled immediate addressing mode, read a second byte quantity of data in the determined storage address to a fourth destination register, and fill a remaining bit of the fourth destination register with a sign bit of the read data.

The first extended memory write instruction is used to instruct to determine a storage address in the memory based on a supported addressing mode, and write a third byte quantity of data in a first source register to the determined storage address.

The second extended memory write instruction is used to instruct to determine a storage address in the memory based on the unscaled immediate addressing mode, and write a third byte quantity of data in a second source register to the determined storage address.

In a possible implementation, the first byte quantity includes one byte, two bytes, four bytes, or eight bytes, the second byte quantity includes one byte, two bytes, or four bytes, and the third byte quantity includes one byte, two bytes, four bytes, or eight bytes.

The addressing modes supported by the first extended memory read instruction, the second extended memory read instruction, and the first extended memory write instruction include a scaled immediate addressing mode, a label addressing mode, or a register addressing mode, and an immediate used when address offset is performed in the scaled immediate addressing mode is a scaled operand in a corresponding instruction.

An immediate used when the address offset is performed in the unscaled immediate addressing mode is an operand in a corresponding instruction, and a value range of the operand is −256 to 256.

In a possible implementation, the read instruction is fetched through compiling an extended memory read instruction, and the extended memory read instruction is an instruction fetched through adding the first semantic to a general memory read instruction in an instruction set of the processor.

The instruction of the write operation is fetched through compiling an extended memory write instruction, and the extended memory write instruction is an instruction fetched through adding the second semantic to a general memory write instruction in the instruction set.

In a possible implementation, the read/write instruction includes a read instruction for performing the read operation on the memory or a write instruction for performing the write operation on the memory, the read instruction is fetched through compiling a general memory read instruction in an instruction set of the processor, and the write instruction is fetched through compiling a general memory write instruction in the instruction set of the processor.

It should be understood that the data processing apparatus 400 corresponds to the processor of the first computing device in the foregoing method embodiments, and the modules and the foregoing other operations and/or functions in the data processing apparatus 400 are respectively for implementing various steps and methods implemented by the processor in the method embodiments. For specific details, refer to the foregoing method embodiments. For brevity, details are not described herein again. In addition, when the data processing apparatus 400 processes data, division into the foregoing functional modules is used as an example for description. In actual application, the foregoing functions may be allocated to different functional modules for implementation based on a requirement. In other words, an internal structure of the data processing apparatus 400 is divided into different functional modules, to complete all or part of the functions described above. In addition, the apparatus 400 provided in the foregoing embodiment and the foregoing method embodiments belong to a same concept. For a specific implementation process, refer to the foregoing method embodiments. Details are not described herein again.

Figure 5:
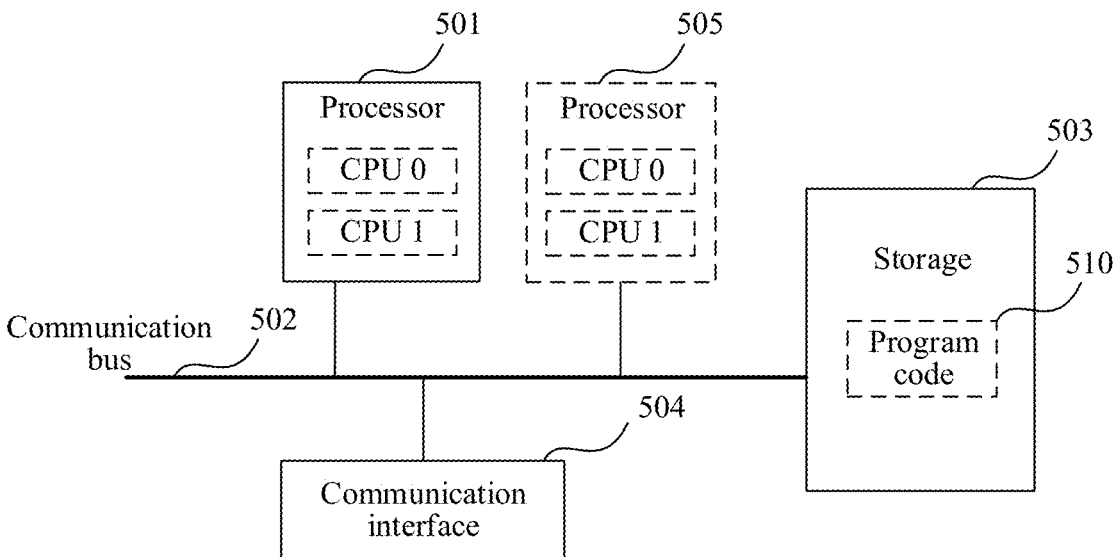
FIG. 5 is a schematic diagram of a structure of a computing device 500 according to an embodiment of this application.

FIG. 5 is a schematic diagram of a structure of a computing device 500 according to an embodiment of this application. It should be understood that the apparatus described below may implement any function of the first computing device in any one of the foregoing methods.

Optionally, the computing device 500 shown in FIG. 5 is configured as the first computing device described above. The computing device 500 includes at least one processor 501, a communication bus 502, a storage 503, and at least one communication interface 504.

The processor 501 may be various computing devices that run software, such as a general-purpose central processing unit (central processing unit, CPU), a network processor (Network Processor, NP), a microprocessor, a microcontroller (microcontroller unit, MCU), a digital signal processor (digital signal processing, DSP), or an artificial intelligence processor. Each computing device may include one or more cores configured to execute software instructions to perform an operation or processing. The processor may be built in a system on chip (system on chip, SoC), or may be one or more integrated circuits configured to implement the solutions of this application, for example, an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable logic gate array (field programmable gate array, FPGA), a generic array logic (generic array logic, GAL), or any combination thereof.

The communication bus 502 is configured to transmit information between the foregoing components. The communication bus 502 may be classified into an address bus, a data bus, a control bus, and the like. For ease of representation, only one thick line is used to represent the bus in the figure, but this does not mean that there is only one bus or only one type of bus.

The storage 503 may include a read-only memory and a random access memory, and provide instructions and data to the processor 501. The storage 503 may further include a non-volatile random access memory. For example, the storage 503 may further store information of a device type.

The storage 503 may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example and not limitation, RAMs in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The storage 503 may exist independently, and is connected to the processor 501 through the communication bus 502. Alternatively, the storage 503 may be integrated with the processor 501.

The communication interface 504 is configured to communicate with another device or a communication network by using any transceiver-type apparatus. The communication interface 504 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (wireless local area network, WLAN) interface, a cellular network communication interface, a combination thereof, or the like.

During specific implementation, in an embodiment, the processor 501 may include one or more CPUs, for example, a CPU 0 and a CPU 1 in FIG. 5.

During specific implementation, in an embodiment, the computing device may include a plurality of processors such as the processor 501 and a processor 505 shown in FIG. 5. Each of the processors may be a single-core processor (single-CPU) or may be a multi-core processor (multi-CPU). The processor herein may be one or more devices, circuits, and/or processing cores configured to process data (for example, computer program instructions).

During specific implementation, in an embodiment, the computing device may further include an output device 506 and an input device 507. The output device 506 communicates with the processor 501, and may display information in a plurality of manners. For example, the output device 506 may be a liquid crystal display (liquid crystal display, LCD), a light emitting diode (light emitting diode, LED) display device, a cathode ray tube (cathode ray tube, CRT) display device, or a projector (projector). The input device 507 communicates with the processor 501, and may receive an input from a user in a plurality of manners. For example, an input device 507 may be a PCIE device, a mouse, a keyboard, a touchscreen device, a sensor device, or the like.

In some embodiments, the storage 503 is configured to store program code 710 for performing the solutions of this application, and the processor 501 may execute the program code 710 stored in the storage 503, to implement the foregoing data processing method. In some other embodiments, based on a hardware structure of the processor 501, the processor 501 can implement the foregoing data processing method.

In an example embodiment, a computer-readable storage medium is further provided, for example, a storage including at least one piece of program code. The at least one piece of program code may be executed by a processor of a computing device to complete the data processing method in the foregoing embodiments. For example, the computer-readable storage medium is a non-temporary computer-readable storage medium, such as a read-only memory (read-only memory, ROM), a random access memory (random access memory, RAM), a compact disc read-only memory (compact disc read-only memory, CD-ROM), a magnetic tape, a floppy disk, or an optical data storage device.

An embodiment of this application further provides a computer program product. The computer program product includes at least one piece of program code. The at least one piece of program code is stored in a computer-readable storage medium. A processor of a computing device reads computer instructions from the computer-readable storage medium, and the processor executes the computer instructions, so that the processor performs the foregoing data processing method.

The apparatus, the device, the computer-readable storage medium, and the computer program product provided in the embodiments are all configured to perform the corresponding method provided above. Therefore, for beneficial effects that can be achieved, refer to the beneficial effects of the corresponding method provided above. Details are not described herein again.

In the several embodiments provided in this application, it should be understood that the disclosed apparatus and method may be implemented in other manners. For example, the described apparatus embodiments are merely examples. For example, division into the modules or units is merely logical function division and may be other division in actual implementation. For example, a plurality of units or components may be combined or integrated into another apparatus, or some features may be ignored or not performed. In addition, the displayed or discussed mutual coupling or direct coupling or communication connection may be an indirect coupling or communication connection through some interfaces, apparatuses or units, and may be in an electrical, mechanical, or other form.

All or some of the foregoing embodiments may be implemented using software, hardware, firmware, or any combination thereof. When software is used to implement embodiments, all or some of the foregoing embodiments may be implemented in a form of a computer program product. The computer program product includes one or more computer instructions. When the computer program instructions are loaded and executed on a computer, all or some of the procedures or functions according to embodiments of this application of the present invention are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state disk (solid state disk, SSD).

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method for data processing, wherein the method is performed by at least one processor of a computing device, and the method comprises:

obtaining an instruction sequence of an application program, wherein the instruction sequence comprises a plurality of instructions, the plurality of instructions comprise read/write instructions for performing at least one of a read operation or a write operation on one or more memories of the computing device, and the application program is deployed in the computing device;

identifying an execution sequence of the read/write instructions based on the instruction sequence; and executing the read/write instructions based on the execution sequence, wherein:

the read/write instructions comprise at least one of a read instruction for performing the read operation on the one or more memories or a write instruction for performing the write operation on the one or more memories, the read instruction has a first semantic, and the write instruction has a second semantic, the first semantic indicates that a first instruction in the instruction sequence is executed after the read instruction is executed, wherein the first semantic prevents any instruction that is arranged after the read instruction in the instruction sequence from being executed before the read instruction is executed; and the second semantic indicates that a second instruction in the instruction sequence is executed before execution of the write instruction is completed, wherein the second semantic prevents any instruction that is arranged before the write instruction in the instruction sequence from being executed after the write instruction is executed, the read instruction is fetched through compiling an extended memory read instruction, the extended memory read instruction has the first semantic, and the extended memory read instruction is an instruction that is added to an instruction set of the at least one processor and that is used to instruct to read memory data; and the write instruction is fetched through compiling an extended memory write instruction, the extended memory write instruction has the second semantic, and the extended memory write instruction is an instruction that is added to the instruction set and that is used to instruct to write the memory data.

2. The method according to claim 1, wherein the identifying an execution sequence of the read/write instructions based on the instruction sequence comprises:

identifying an arrangement sequence of the read/write instructions in the instruction sequence as the execution sequence of the read/write instructions.

3. The method according to claim 2, wherein the identifying an arrangement sequence of the read/write instructions in the instruction sequence as the execution sequence of the read/write instructions comprises:

identifying, in a sequential memory access mode, the arrangement sequence of the read/write instructions in the instruction sequence as the execution sequence of the read/write instructions, wherein the sequential memory access mode requires that the execution sequence of the read/write instructions be consistent with the arrangement sequence of the read/write instructions in the instruction sequence.

4. The method according to claim 1, wherein:

for the first semantic, the first instruction is arranged after the read instruction in the instruction sequence; and for the second semantic, the second instruction is arranged before the write instruction in the instruction sequence.

5. The method according to claim 1, wherein:

the extended memory read instruction comprises at least one of a first extended memory read instruction, a second extended memory read instruction, a third extended memory read instruction, or a fourth extended memory read instruction, and the extended memory write instruction comprises at least one of a first extended memory write instruction or a second extended memory write instruction;

none of addressing modes supported by the first extended memory read instruction, the second extended memory read instruction, and the first extended memory write instruction comprises an unscaled immediate addressing mode, and all of the third extended memory read instruction, the fourth extended memory read instruction, and the second extended memory write instruction support the unscaled immediate addressing mode;

the first extended memory read instruction is used to instruct to determine a storage address in the one or more memories based on at least one of the supported addressing modes, and read a first byte quantity of data in the determined storage address to a first destination register;

the second extended memory read instruction is used to instruct to determine a storage address in the one or more memories based on at least one of the supported addressing modes, read a second byte quantity of data in the determined storage address to a second destination register, and fill a remaining bit of the second destination register with a sign bit of the read data;

the third extended memory read instruction is used to instruct to determine a storage address in the one or more memories based on the unscaled immediate addressing mode, and read a first byte quantity of data in the determined storage address to a third destination register;

the fourth extended memory read instruction is used to instruct to determine a storage address in the one or more memories based on the unscaled immediate addressing mode, read a second byte quantity of data in the determined storage address to a fourth destination register, and fill a remaining bit of the fourth destination register with a sign bit of the read data;

the first extended memory write instruction is used to instruct to determine a storage address in the one or more memories based on at least one of the supported addressing modes, and write a third byte quantity of data in a first source register to the determined storage address; and the second extended memory write instruction is used to instruct to determine a storage address in the one or more memories based on the unscaled immediate addressing mode, and write a third byte quantity of data in a second source register to the determined storage address.

6. The method according to claim 5, wherein:

the first byte quantity comprises one byte, two bytes, four bytes, or eight bytes, the second byte quantity comprises one byte, two bytes, or four bytes, and the third byte quantity comprises one byte, two bytes, four bytes, or eight bytes;

the addressing modes supported by the first extended memory read instruction, the second extended memory read instruction, and the first extended memory write instruction comprise at least one of a scaled immediate addressing mode, a label addressing mode, or a register addressing mode, and an immediate used when address offset is performed in the scaled immediate addressing mode is a scaled operand in a corresponding instruction; and an immediate used when the address offset is performed in the unscaled immediate addressing mode is an operand in a corresponding instruction, and a value range of the operand is −256 to 256.

7. The method according to claim 1, wherein:

the read/write instructions comprise a second read instruction that is fetched through compiling a second extended memory read instruction, and the second extended memory read instruction is an instruction fetched through adding the first semantic to a general memory read instruction in an instruction set of the at least one processor; and the read/write instructions comprise a second write instruction that is fetched through compiling a second extended memory write instruction, and the second extended memory write instruction is an instruction fetched through adding the second semantic to a general memory write instruction in the instruction set.

8. The method according to claim 1, wherein the read/write instructions comprise a third read instruction that is fetched through compiling a general memory read instruction in an instruction set of the at least one processor, and the read/write instructions comprise a third write instruction that is fetched through compiling a general memory write instruction in the instruction set of the at least one processor.

9. A computer device, comprising:

at least one processor; and one or more memories coupled to the at least one processor and storing programming instructions for execution by the at least one processor to perform operations comprising:

obtaining an instruction sequence of an application program, wherein the instruction sequence comprises a plurality of instructions, the plurality of instructions comprise read/write instructions for performing at least one of a read operation or a write operation on the one or more memories of the computing device, and the application program is deployed in the computing device;

identifying an execution sequence of the read/write instructions based on the instruction sequence; and executing the read/write instructions based on the execution sequence, wherein:

the read/write instructions comprise at least one of a read instruction for performing the read operation on the one or more memories or a write instruction for performing the write operation on the one or more memories, the read instruction has a first semantic, and the write instruction has a second semantic, the first semantic indicates that a first instruction in the instruction sequence is executed after the read instruction is executed, wherein the first semantic prevents any instruction that is arranged after the read instruction in the instruction sequence from being executed before the read instruction is executed; and the second semantic indicates that a second instruction in the instruction sequence is executed before execution of the write instruction is completed, wherein the second semantic prevents any instruction that is arranged before the write instruction in the instruction sequence from being executed after the write instruction is executed, the read instruction is fetched through compiling an extended memory read instruction, the extended memory read instruction has the first semantic, and the extended memory read instruction is an instruction that is added to an instruction set of the at least one processor and that is used to instruct to read memory data; and the write instruction is fetched through compiling an extended memory write instruction, the extended memory write instruction has the second semantic, and the extended memory write instruction is an instruction that is added to the instruction set and that is used to instruct to write the memory data.

10. The computer device according to claim 9, wherein the identifying an execution sequence of the read/write instructions based on the instruction sequence comprises:

identifying an arrangement sequence of the read/write instructions in the instruction sequence as the execution sequence of the read/write instructions.

11. The computer device according to claim 10, wherein the identifying an arrangement sequence of the read/write instructions in the instruction sequence as the execution sequence of the read/write instructions comprises:

identifying, in a sequential memory access mode, the arrangement sequence of the read/write instructions in the instruction sequence as the execution sequence of the read/write instructions, wherein the sequential memory access mode requires that the execution sequence of the read/write instructions be consistent with the arrangement sequence of the read/write instructions in the instruction sequence.

12. The computer device according to claim 9, wherein:

for the first semantic, the first instruction is arranged after the read instruction in the instruction sequence; and for the second semantic, the second instruction is arranged before the write instruction in the instruction sequence.

13. The computer device according to claim 9, wherein:

the extended memory read instruction comprises at least one of a first extended memory read instruction, a second extended memory read instruction, a third extended memory read instruction, or a fourth extended memory read instruction, and the extended memory write instruction comprises at least one of a first extended memory write instruction or a second extended memory write instruction;

none of addressing modes supported by the first extended memory read instruction, the second extended memory read instruction, and the first extended memory write instruction comprises an unscaled immediate addressing mode, and all of the third extended memory read instruction, the fourth extended memory read instruction, and the second extended memory write instruction support the unscaled immediate addressing mode;

the first extended memory read instruction is used to instruct to determine a storage address in the one or more memories based on at least one of the supported addressing modes, and read a first byte quantity of data in the determined storage address to a first destination register;

the second extended memory read instruction is used to instruct to determine a storage address in the one or more memories based on at least one of the supported addressing modes, read a second byte quantity of data in the determined storage address to a second destination register, and fill a remaining bit of the second destination register with a sign bit of the read data;

the third extended memory read instruction is used to instruct to determine a storage address in the one or more memories based on the unscaled immediate addressing mode, and read a first byte quantity of data in the determined storage address to a third destination register;

the fourth extended memory read instruction is used to instruct to determine a storage address in the one or more memories based on the unscaled immediate addressing mode, read a second byte quantity of data in the determined storage address to a fourth destination register, and fill a remaining bit of the fourth destination register with a sign bit of the read data;

the first extended memory write instruction is used to instruct to determine a storage address in the one or more memories based on at least one of the supported addressing modes, and write a third byte quantity of data in a first source register to the determined storage address; and the second extended memory write instruction is used to instruct to determine a storage address in the one or more memories based on the unscaled immediate addressing mode, and write a third byte quantity of data in a second source register to the determined storage address.

14. The computer device according to claim 13, wherein:
the first byte quantity comprises one byte, two bytes, four bytes, or eight bytes, the second byte quantity comprises one byte, two bytes, or four bytes, and the third byte quantity comprises one byte, two bytes, four bytes, or eight bytes;

the addressing modes supported by the first extended memory read instruction, the second extended memory read instruction, and the first extended memory write instruction comprise at least one of a scaled immediate addressing mode, a label addressing mode, or a register addressing mode, and an immediate used when address offset is performed in the scaled immediate addressing mode is a scaled operand in a corresponding instruction; and an immediate used when the address offset is performed in the unscaled immediate addressing mode is an operand in a corresponding instruction, and a value range of the operand is −256 to 256.

15. The computer device according to claim 9, wherein:
the read/write instructions comprise a second read instruction that is fetched through compiling a second extended memory read instruction, and the second extended memory read instruction is an instruction fetched through adding the first semantic to a general memory read instruction in an instruction set of the at least one processor; and the read/write instructions comprise a second write instruction that is fetched through compiling a second extended memory write instruction, and the second extended memory write instruction is an instruction fetched through adding the second semantic to a general memory write instruction in the instruction set.

16. The computer device according to claim 9, wherein the read/write instructions comprise a third read instruction that is fetched through compiling a general memory read instruction in an instruction set of the at least one processor, and the read/write instructions comprise a third write instruction that is fetched through compiling a general memory write instruction in the instruction set of the at least one processor.

17. A non-transitory computer-readable storage medium, wherein the non-transitory computer-readable storage medium stores at least one piece of program code, and the at least one piece of program code is read by at least one processor of a computing device, to enable the at least one processor to:

obtain an instruction sequence of an application program, wherein the instruction sequence comprises a plurality of instructions, the plurality of instructions comprise read/write instructions for performing at least one of a read operation or a write operation on one or more memories of the computing device, and the application program is deployed in the computing device;

identify an execution sequence of the read/write instructions based on the instruction sequence; and execute the read/write instructions based on the execution sequence, wherein:

the read/write instructions comprise at least one of a read instruction for performing the read operation on the one or more memories or a write instruction for performing the write operation on the one or more memories, the read instruction has a first semantic, and the write instruction has a second semantic, the first semantic indicates that a first instruction in the instruction sequence is executed after the read instruction is executed, wherein the first semantic prevents any instruction that is arranged after the read instruction in the instruction sequence from being executed before the read instruction is executed; and the second semantic indicates that a second instruction in the instruction sequence is executed before execution of the write instruction is completed, wherein the second semantic prevents any instruction that is arranged before the write instruction in the instruction sequence from being executed after the write instruction is executed, the read instruction is fetched through compiling an extended memory read instruction, the extended memory read instruction has the first semantic, and the extended memory read instruction is an instruction that is added to an instruction set of the at least one processor and that is used to instruct to read memory data; and the write instruction is fetched through compiling an extended memory write instruction, the extended memory write instruction has the second semantic, and the extended memory write instruction is an instruction that is added to the instruction set and that is used to instruct to write the memory data.

18. The non-transitory computer-readable storage medium of claim 17, wherein the execution sequence of the read/write instructions is identified based on the instruction sequence by:

identifying, in a sequential memory access mode, an arrangement sequence of the read/write instructions in the instruction sequence as the execution sequence of the read/write instructions, wherein the sequential memory access mode requires that the execution sequence of the read/write instructions be consistent with the arrangement sequence of the read/write instructions in the instruction sequence.

19. The non-transitory computer-readable storage medium of claim 17, wherein:

for the first semantic, the first instruction is arranged after the read instruction in the instruction sequence; and for the second semantic, the second instruction is arranged before the write instruction in the instruction sequence.

20. The non-transitory computer-readable storage medium of claim 17, wherein:

the read/write instructions comprise a second read instruction that is fetched through compiling a second extended memory read instruction, and the second extended memory read instruction is an instruction fetched through adding the first semantic to a general memory read instruction in an instruction set of the at least one processor; and the read/write instructions comprise a second write instruction that is fetched through compiling a second extended memory write instruction, and the second extended memory write instruction is an instruction fetched through adding the second semantic to a general memory write instruction in the instruction set.

* * * * *